(12) United States Patent
Hosokane

(10) Patent No.: US 9,892,300 B2
(45) Date of Patent: Feb. 13, 2018

(54) TWO-DIMENSIONAL CODE

(71) Applicant: KYODO PRINTING CO., LTD., Tokyo (JP)

(72) Inventor: Yutaka Hosokane, Tokyo (JP)

(73) Assignee: KYODO PRINTING CO., LTD., Tokyo (JP)

(*) Notice: Subject to any disclaimer, the term of this patent is extended or adjusted under 35 U.S.C. 154(b) by 0 days.

(21) Appl. No.: 14/441,936

(22) PCT Filed: Nov. 7, 2013

(86) PCT No.: PCT/JP2013/080142
§ 371 (c)(1),
(2) Date: May 11, 2015

(87) PCT Pub. No.: WO2014/077184
PCT Pub. Date: May 22, 2014

(65) Prior Publication Data
US 2015/0339508 A1   Nov. 26, 2015

(30) Foreign Application Priority Data

Nov. 13, 2012   (JP) ................. 2012-249784

(51) Int. Cl.
*G06K 7/10*   (2006.01)
*G06K 7/14*   (2006.01)
(Continued)

(52) U.S. Cl.
CPC ......... *G06K 7/1417* (2013.01); *G06K 7/1443* (2013.01); *G06K 7/1456* (2013.01);
(Continued)

(58) Field of Classification Search
CPC .......... G06K 19/06037; G06K 7/1456; G06K 7/1417; G06K 19/06009; G06K 19/06075;
(Continued)

(56) References Cited

U.S. PATENT DOCUMENTS 5,691,527 A   11/1997   Hara
5,726,435 A   3/1998    Hara et al.
(Continued)

FOREIGN PATENT DOCUMENTS

CN   101908144 A   12/2010
CN   202267974 U   6/2012
(Continued)

OTHER PUBLICATIONS

Search Report related to Singapore Patent Application No. 11201503741U dated Nov. 18, 2015.
(Continued)

*Primary Examiner* — Claude J Brown
(74) *Attorney, Agent, or Firm* — Millen, White, Zelano & Branigan, P.C.; William Nixon; John Sopp

(57) ABSTRACT

Disclosed is a two-dimensional code which is not likely to be affected by contamination or out-of-focus photographing thereof and can thus be accurately recognized in a short time even when it is photographed under various photographing conditions. The disclosed two-dimensional code comprises: cells representing binary-coded data that are arranged as a pattern in a two-dimensional matrix; and four or more different position detection patterns.

34 Claims, 21 Drawing Sheets

(51) Int. Cl.
*G06K 19/06* (2006.01)
*G06K 7/015* (2006.01)

(52) U.S. Cl.
CPC . *G06K 19/06009* (2013.01); *G06K 19/06037* (2013.01); *G06K 19/06056* (2013.01); *G06K 19/06103* (2013.01); *G06K 19/06131* (2013.01); *G06K 7/015* (2013.01); *G06K 2019/06262* (2013.01)

(58) Field of Classification Search
CPC ........... G06K 19/06131; G06K 7/1473; G06K 7/015; G06K 19/06103; G06K 19/06056; G06K 2019/06262; G06K 7/1443
USPC ...................................... 235/462.09
See application file for complete search history.

(56) References Cited

U.S. PATENT DOCUMENTS

| | | | |
|---|---|---|---|
| 5,825,015 A | | 10/1998 | Chan |
| 6,186,405 B1* | | 2/2001 | Yoshioka ............. G06K 7/1092 |
| | | | 235/456 |
| 6,267,296 B1* | | 7/2001 | Ooshima .......... G06K 19/06037 |
| | | | 235/462.08 |
| 7,014,123 B2* | | 3/2006 | Lapstun ................... G06K 7/14 |
| | | | 235/462.01 |
| 7,377,449 B2* | | 5/2008 | Bian ................ G06K 19/06037 |
| | | | 235/462.01 |
| 7,857,232 B2* | | 12/2010 | Ayatsuka ......... G06K 19/06037 |
| | | | 235/462.09 |
| 8,061,615 B2* | | 11/2011 | Yada ........................ G06K 7/14 |
| | | | 235/462.08 |
| 2004/0182930 A1 | | 9/2004 | Nojiri |
| 2006/0261175 A1 | | 11/2006 | Angelucci et al. |
| 2007/0152060 A1* | | 7/2007 | Kiliccote ............. G06K 7/1443 |
| | | | 235/462.09 |
| 2007/0228171 A1* | | 10/2007 | Thiyagarajah ........... G06K 7/14 |
| | | | 235/462.09 |
| 2009/0078772 A1 | | 3/2009 | Ofek et al. |
| 2009/0242649 A1 | | 10/2009 | Mizukoshi et al. |
| 2010/0006657 A1 | | 1/2010 | Liao et al. |
| 2010/0155464 A1 | | 6/2010 | Swayn et al. |
| 2011/0290879 A1* | | 12/2011 | Guo ................... G06K 7/10851 |
| | | | 235/437 |

FOREIGN PATENT DOCUMENTS

| | | | |
|---|---|---|---|
| JP | 07-254037 A | 10/1994 |
| JP | 1996180125 A | 7/1996 |
| JP | 2004-206674 A | 7/2004 |
| JP | 2004-234318 A | 8/2004 |
| JP | 2007-241328 A | 9/2007 |
| JP | 2009-075873 A | 4/2009 |
| JP | 2009-163720 A | 7/2009 |
| JP | 2009-259192 A | 11/2009 |
| JP | 2010-170539 A | 8/2010 |
| JP | 2011-070477 A | 4/2011 |
| KR | 20050046997 A | 5/2005 |
| TW | 200503433 A | 1/2005 |
| TW | 200915193 A | 4/2009 |
| TW | 201003536 A | 1/2010 |
| WO | 95/30206 A1 | 11/1995 |

OTHER PUBLICATIONS

International Search Report from PCT/JP2013/080142 dated Dec. 10, 2013.
Japanese Written Opinion and Report on Patentability for PCT/JP2013/080142 dated Mar. 16, 2015.
English translation Abstract of KR20050046997A published May 19, 2005 (1 page).

* cited by examiner

FIG. 4
(A)
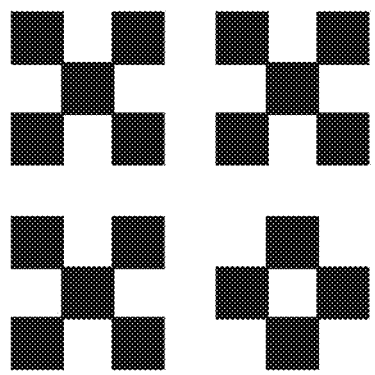
(B)
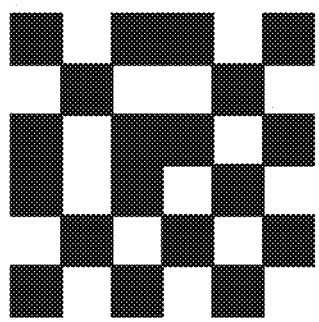

| a | b | c |
|---|---|---|
| d | e | f |
| g | h | i |

(B)

| j1 | j2 | j3 |
|---|---|---|
| j4 | 1 | j5 |
| j6 | j7 | j8 |

(C)

| k1 | k2 | k3 |
|---|---|---|
| k4 | 0 | k5 |
| k6 | k7 | k8 |

(D1)

| 1 | 0 | 0 |
|---|---|---|
| 0 | 1 | 1 |
| 0 | 1 | 1 |

(D2)

| 0 | 1 | 0 |
|---|---|---|
| 0 | 1 | 0 |
| 1 | 1 | 1 |

(D3)

| 0 | 0 | 1 |
|---|---|---|
| 1 | 1 | 0 |
| 1 | 1 | 0 |

(D4)

| 1 | 0 | 0 |
|---|---|---|
| 1 | 1 | 1 |
| 1 | 0 | 0 |

(D5)

| 1 | 1 | 0 |
|---|---|---|
| 1 | 1 | 0 |
| 0 | 0 | 1 |

(D6)

| 1 | 1 | 1 |
|---|---|---|
| 0 | 1 | 0 |
| 0 | 1 | 0 |

(D7)

| 0 | 1 | 1 |
|---|---|---|
| 0 | 1 | 1 |
| 1 | 0 | 0 |

(D8)

| 0 | 0 | 1 |
|---|---|---|
| 1 | 1 | 1 |
| 0 | 0 | 1 |

FIG. 10
(A)
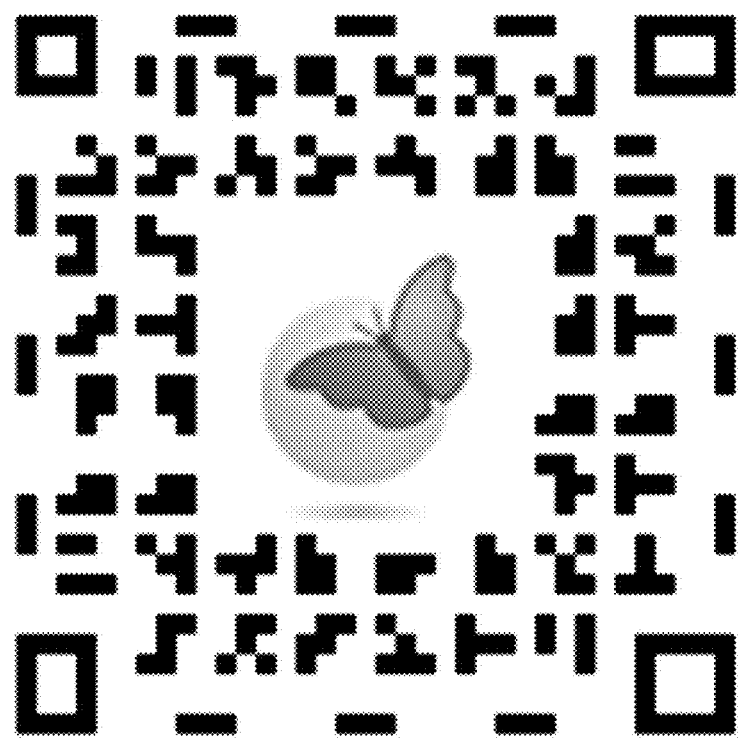
(B)

FIG. 12
(A)
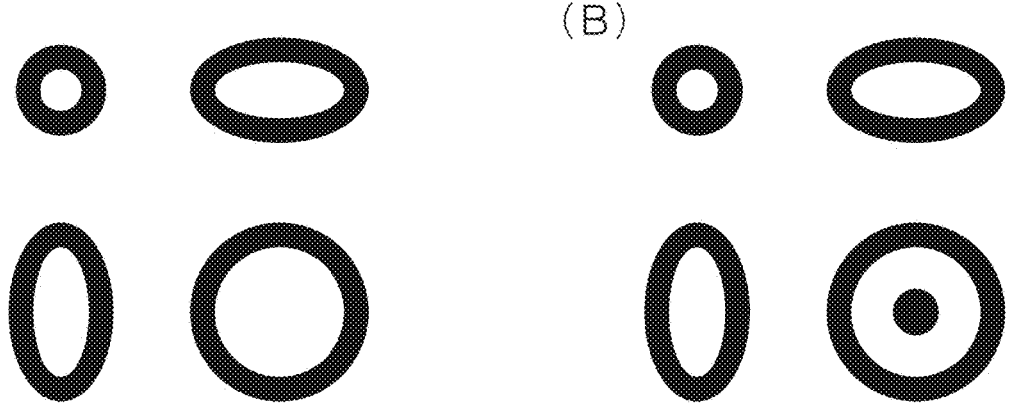
(B)
(C)
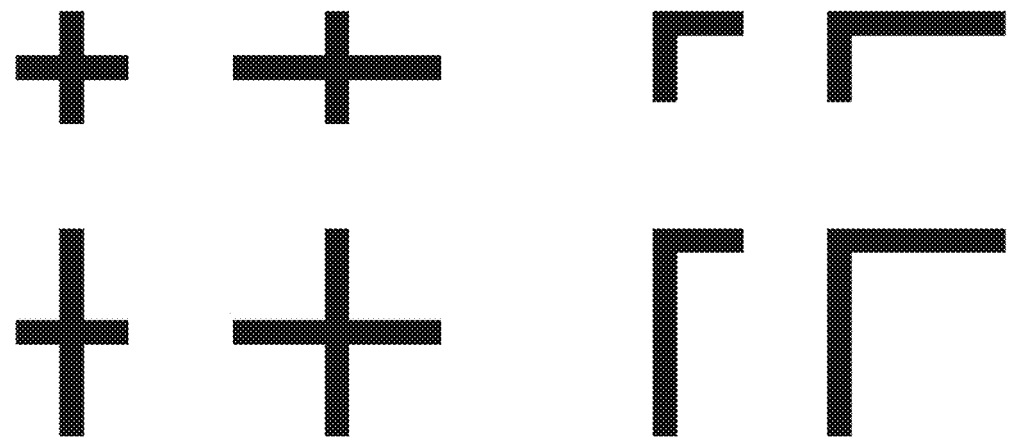
(D)
(E)

FIG. 21
(A)
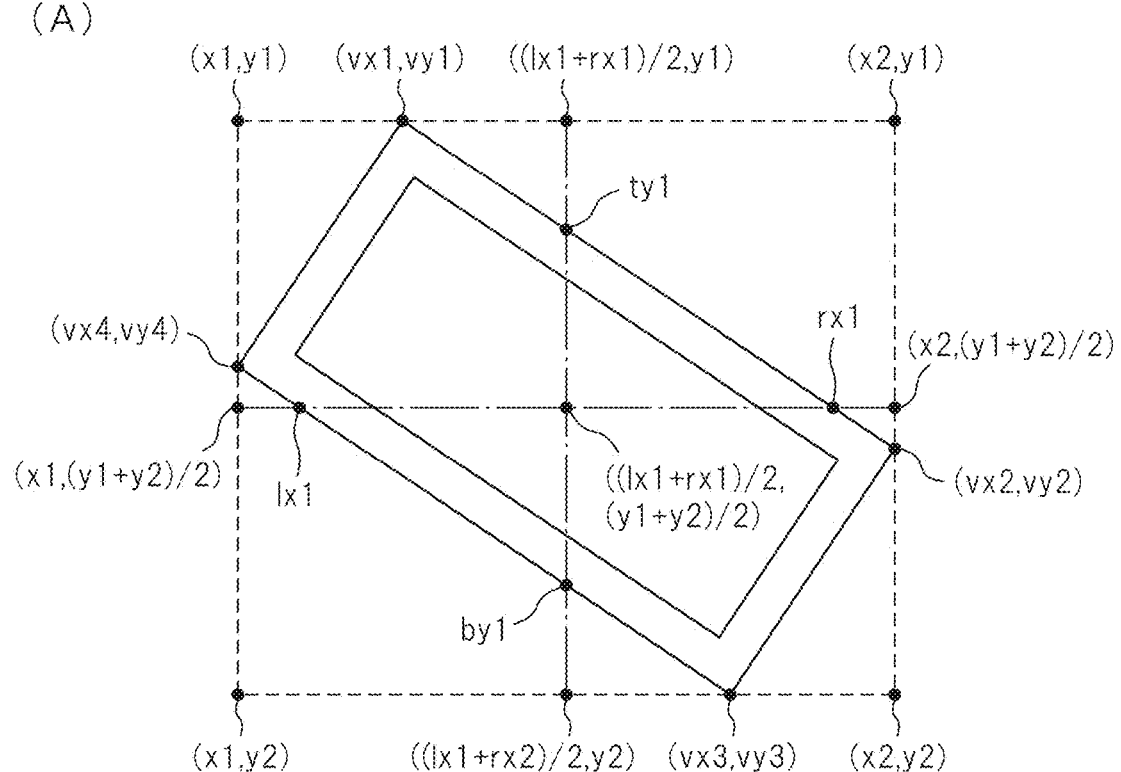
(B)
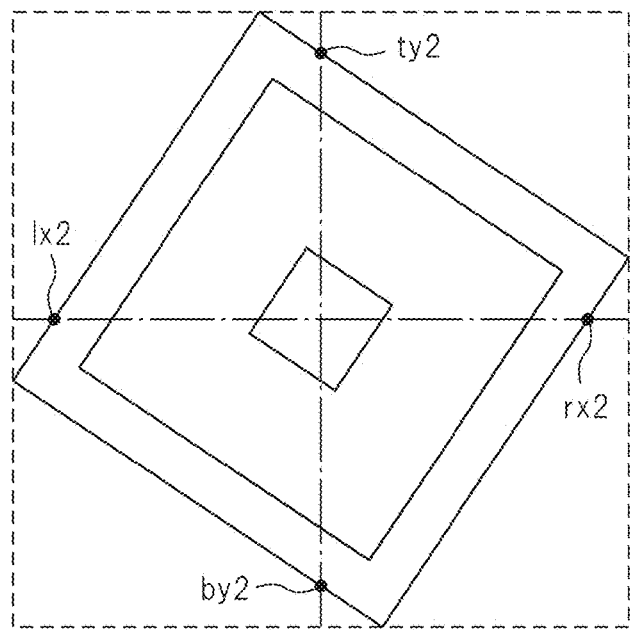

TWO-DIMENSIONAL CODE

FIELD OF THE INVENTION

The present invention relates to a two-dimensional code.

DESCRIPTION OF THE RELATED ART

Compared to one-dimensional codes, two-dimensional codes are capable of storing more information in a smaller area and are thus widely utilized in a variety of applications, including inventory management and Web derivatives using mobile phones. Since two-dimensional codes are photographed (taken) at various angles, the sizes and the orientations of their images projected on a screen are not constant, and distortion, blurriness and the like of the images may occur. Further, when a two-dimensional code is dirty, part of its image may not be recognized.

Two-dimensional codes generally have a substantially square or rectangular shape, and their images are converted to the respective original shapes and then subjected to an analysis (decoding) process based on the pixel value of each cell. A two-dimensional code comprises position detection patterns of a prescribed shape for detection of the positional relationship of its photographed image. When a two-dimensional code is analyzed, on its photographed image, the position detection patterns are detected and converted based on their positional relationships. Detection of the position detection patterns is a fundamental process of the analysis and, since this process largely affects the recognition accuracy as well as the analysis time, detection of the position detection patterns is a critical element of the analysis.

In a common two-dimensional code widely used at present, a position detection pattern capable of yielding the same frequency component ratio for a scanning line crossing the center of the pattern at various angles is used so that the position detection pattern can be quickly analyzed, and three of such position detection pattern are arranged at three of the four corners of the two-dimensional code. Consequently, regardless of the rotational position at which the two-dimensional code is photographed, scanning of the position detection patterns through their centers yields a length (frequency) ratio of dark:light:dark:light:dark=1:1:3:1:1. Therefore, once this light-dark ratio is obtained from scanning in the lateral direction, by subsequently performing a simple image processing of scanning in the vertical (longitudinal) direction to determine the light-dark ratio, the position detection patterns can be quickly detected.

The above-described detection of the position detection patterns is carried out by scanning the pixels of the entire subject region where the two-dimensional code is placed. When the photographed image of the two-dimensional code is a VGA image, a region of 640×480=307,200 pixels is to be processed, and a long time is thus required for scanning all of these pixels. Consequently, the detection of the position detection patterns accounts for an undeniably large portion of the analysis time.

Furthermore, there is a need for a plurality of codes to all be recognized at the same time. For example, when cardboard boxes each having a two-dimensional code pasted thereon are stored facing the same direction on a shelf and an inventory thereof is to be made, the work efficiency is improved if the two-dimensional codes could be recognized at once from a distance, rather than recognizing the codes one by one at a short distance from each box. It is known that such simultaneous recognition can be done by using an RFID or the like; however, RFIDs require an antenna or the like on the media side, resulting in an increased media cost. In contrast, two-dimensional codes are inexpensive because they can be used by simply printing them on a sheet of paper.

In cases where a plurality of two-dimensional codes are all recognized at once, a plurality of position detection patterns are projected in a single image. When the above-described two-dimensional code having three identical position detection patterns is used, a large number of the identical position detection patterns is included in the image, so that the position of the code has to be detected based on a large number of position detection pattern combinations. This increases the number of the position detection pattern combinations to be verified and consequently increases the processing time, and therefore may not be quickly recognizable.

Further, there are also known two-dimensional codes having only one position detection pattern, such as one whose position and rotation angle are detected based on an L-shaped frame and the four timing patterns that are dotted lines arranged facing with each other. Even when a plurality of such two-dimensional codes exist in a single image, as long as the position detection pattern can be recognized, its corresponding two-dimensional code can be recognized. However, although such a two-dimensional code has only one position detection pattern, the position detection pattern itself is complex; therefore, its calculation load is greater than a case of recognizing the above-described three identical position detection patterns.

In addition, in a two-dimensional code having only one position detection pattern, it is required to clearly separate the position detection pattern from any noise information projected in the image. In particular, when the one position detection pattern cannot be detected due to contamination or image blurriness, the analysis of the two-dimensional code will be defective.

Moreover, there are also known colored two-dimensional codes. Patent Document 2 discloses a two-dimensional code comprising position detection patterns of two different shapes, each of which is colored differently. However, colored two-dimensional codes have a problem in that they are affected by the lighting conditions and the like at the time of being photographed.

As described above, a variety of two-dimensional codes have been proposed and they each have advantages and disadvantages.

In conventional two-dimensional codes, great importance was attached to the data efficiency and this consequently made the two-dimensional codes likely to be adversely affected by contamination, out-of-focus photographing and the like. For example, in the above-described case where an inventory is made using a plurality of two-dimensional codes projected on a single screen, it is difficult to bring all of the two-dimensional codes into focus when taking an image thereof, and an out-of-focus image is thus likely to be produced. Since it is difficult to correct an out-of-focus or blurred image of a two-dimensional code and an improvement by software is thus limited, an improvement of hardware, such as an improvement of the auto-focus function and an increase in the shutter speed, is required, and this leads to a problem of an increased cost. Recently, there is a need for a two-dimensional code that can be recognized by cameras mounted on mobile phones; however, because such cameras are used in an environment that is likely to create problems for the analysis of a two-dimensional code, such as image blurriness caused by tilting, movement or insufficient focusing of the cameras during photographing, and also from the standpoint of their cost and size, it is difficult to improve the mobile phone cameras and the like at present.

Furthermore, although commonly used two-dimensional codes have an error-correcting function, it is designed for error correction in the data region and is not capable of correcting position detection patterns (positioning patterns); therefore, contamination or damage of the position detection patterns make it difficult to recognize these two-dimensional codes, or can even make the two-dimensional codes undetectable.

PRIOR ART REFERENCES

Patent Documents

[Patent Document 1] Japanese Laid-open Patent Publication No. H7-254037
[Patent Document 2] Japanese Laid-open Patent Publication No. 2004-234318
[Patent Document 3] Japanese Laid-open Patent Publication No. 2007-241328
[Patent Document 4] Japanese Laid-open Patent Publication No. 2009-163720
[Patent Document 5] Japanese Laid-open Patent Publication No. 2009-075873

SUMMARY OF THE INVENTION

Problems to be Solved by the Invention

As described above, there have been used and proposed a variety of two-dimensional codes; however, there is still a demand for a two-dimensional code which can be accurately recognized in a short time even when a plurality thereof is photographed at the same time or when it is photographed under various conditions, such as an environment where an out-of-focus or blur image occurs.

An object of the present invention is to realize a two-dimensional code which can be recognized in a short time even on an image photographed with a plurality of codes at the same time, which two-dimensional code is not likely to be affected by contamination thereof, out-of-focus photographing or the like and can be accurately recognized even when it is photographed under various photographing conditions.

Means for Solving the Problems

In order to achieve the above-described object, the two-dimensional code of the present invention is a two-dimensional code comprising cells representing binary-coded data that are arranged as a pattern in the form of a two-dimensional matrix, the two-dimensional code being characterized by comprising four or more different position detection patterns. The phrase "different position detection patterns" means that the position detection patterns are different in terms of shape, size and arrangement orientation on the two-dimensional code, and also include cases where the position detection patterns have different line width ratios. However, since color is affected by the photographing conditions and the like, color is not included as a subject of the difference, and a difference in a light-dark binary image is considered.

As described above, a position detection pattern that yields a ratio of dark:light:dark:light:dark=1:1:3:1:1 when its center is scanned has an advantage of being easily detectable by a simple image processing of sequentially scanning the pixels. However, in recent years, due to improvements in the calculation/processing capacity and memory capacity of computers (processors) integrated in two-dimensional code analyzers as well as the performance of optical instruments, it is now possible to perform complex and high-speed image processing. Accordingly, in cases where such an analyzer with improved performances is used for analysis, in terms of accelerating the detection of position detection patterns and performing projective transformation of an two-dimensional code image based on its detected position detection patterns, those position detection patterns of the previously proposed two-dimensional codes are not necessarily considered preferable. In recent years, it has also become possible to recognize a plurality of two-dimensional codes at once; however, the previously proposed two-dimensional codes do not have a structure suitable for such recognition because they use position detection patterns that are all identical and this leads to an increased number of operations required for checking their combinations and the like.

The two-dimensional code of the present invention comprises four or more different position detection patterns. Thus, these position detection patterns cannot be recognized based on the light-dark pixel sequence ratio. However, due to an increase in the speed of image processing, detection of a prescribed shape such as a square or rectangular frame is easier than before. For example, while scanning such a shape in the lateral direction, a set of consecutive dark pixels is detected once the scanning line hits a dark pixel cell, and the periphery of the shape is also detected, thereby the external form of the shape can be easily identified. In addition, by further detecting the inside perimeter in the same manner, a frame can be easily identified. As long as the pattern to be detected has a prescribed size or larger in all directions, such shape detection can be performed with omission of some scanning lines, so that the number of scanning operations is reduced. Moreover, an already processed region can be excluded from the regions to be searched. Therefore, even when the processing load of shape recognition is increased, an increase in the actual processing load can be suppressed, or the processing load can be reduced.

The above-described image processing technology can also be applied to the position detection pattern that yields a ratio of dark:light:dark:light:dark=1:1:3:1:1. However, since this position detection pattern has a shape and an arrangement that are devised assuming total scanning, it is a large position detection pattern. Accordingly, when the above-described image processing technology is applied to this position detection pattern, the advantage of the position detection pattern cannot be fully utilized, and there is a problem that the position detection pattern is thus not necessarily considered effective in the application of the above-described image processing technology.

Further, in cases where a large number of two-dimensional codes is projected on a single screen, all combinations of their position detection patterns are assessed whether or not each of them is a proper combination; however, when the plural position detection patterns of each two-dimensional code are different, the number of their combinations can be largely reduced and the processing load for assessing whether or not each combination is a proper combination can be consequently reduced.

Moreover, when the position detection patterns are different, detection of one position detection pattern makes it easy to estimate the orientations and positions of other position detection patterns, and the number of the scanning operations as well as the processing load for detecting a set of consecutive dark pixels can also be reduced in the application of the above-described search method.

In particular, it is desired that at least three of the four or more different position detection patterns each have a frame shape in which an identification space is arranged and that the identification space be at least twice larger than the smallest cell constituting the two-dimensional code. This is because, in the two-dimensional code of the present invention, for example, as long as three of the four position detection patterns can be detected, it is always possible to understand the rotation angle information of the two-dimensional code and acquire the arrangement information by the below-described method.

The position detection patterns can be easily distinguished from other projected patterns based on the presence or absence of the internal identification space, and this is effective against image blurriness and fuzziness. In this case, it is desired that the identification space have a size of two or more cells. The reason for this is as follows. In a two-dimensional code in which the smallest cell represents 1 bit, when blurriness or fuzziness occurs over an area of one cell or larger, even if the positions of the position patterns could be detected, data cannot be acquired. Under normal photographing conditions, blurriness or fuzziness rarely occurs over an area of one cell or larger; therefore, an identification space of two cells in size can handle single-cell blurriness and fuzziness in all directions. This is also effective against a reduction in the size of each two-dimensional code, which leads to increased effects of blurriness and fuzziness and generation of an obscure image of the two-dimensional codes, when a plurality of two-dimensional codes are photographed and projected on a single screen.

Furthermore, it is desired that the position detection patterns be composed of a combination of squares and rectangles.

When a plurality of two-dimensional codes are projected on a single screen altogether, there are problems that the number of position detection pattern combinations is increased and this leads to an increase in the processing load for examining the plural combinations; and that the image of each two-dimensional code is reduced in size and the image of the two-dimensional codes thus becomes obscure, making the detection of the codes difficult. As described above, by allowing the position detection patterns to have a frame shape in which an identification space is arranged and to be composed of a combination of squares and rectangles, not only the position detection patterns can be made different from each other without much increase in size but also blackening-out of the image is unlikely to occur, so that the above-described two problems can be solved.

The four or more position detection patterns are, for example, four position detection patterns that are composed of: a square first position detection pattern; a square second position detection pattern, which is smaller than the first position detection pattern; and rectangular third and fourth position detection patterns, and these four position detection patterns are arranged at four corners of a two-dimensional matrix. In this case, it is desired that: the first and second position detection patterns be arranged at opposite diagonal corners; the third and fourth position detection patterns be arranged at opposite diagonal corners; the long side of the third position detection pattern and that of the fourth position detection pattern have the same length as the side of the first position detection pattern; the short side of the third position detection pattern and that of the fourth position detection pattern have the same length as the side of the second position detection pattern; one of the short sides of the third position detection pattern and that of the fourth position detection pattern be arranged on the extension of the side of the first position detection pattern; and one of the long sides of the third position detection pattern and that of the fourth position detection pattern be arranged on the extension of the side of the second position detection pattern.

As long as the above-described four position detection patterns have a certain size or larger, the possibility that a similar shape other than the position detection patterns appears in the two-dimensional code is low and the position detection patterns are thus relatively easily detected; therefore, even when the two-dimensional code is photographed from various directions and the resulting image is distorted, the direction of the distortion is easily specified.

Further, the first and second position detection patterns may each have a single square frame, and the third and fourth position detection patterns may each have a single rectangular frame.

When the position detection patterns are in a frame shape, the possibility that a similar shape other than the position detection patterns appears in the two-dimensional code is further reduced, so that the position detection patterns are relatively easily detected.

Still further, the first position detection pattern may have a single square frame and a square arranged therein, the second position detection pattern may have a single square frame, and the third and fourth position detection patterns may each have a single rectangular frame.

Thus, the first position detection pattern is made similar to the above-described position detection pattern that yields a length ratio of dark:light:dark:light:dark=1:1:3:1:1, so that its area and the time required for the detection process are increased. However, the increase in area is small because it is restricted to the one position detection pattern and, although the time required for the detection process is slightly increased, the possibility that a similar shape other than this position detection pattern appears in the two-dimensional code is almost zero; therefore, an improved detection accuracy can be attained.

Yet still further, it is desired that the region of the two-dimensional matrix that excludes the parts of the four or more position detection patterns be divided into a plurality of blocks having the same size, and that the two-dimensional matrix comprise a light or dark separation space between adjacent blocks. Accordingly, the separation space is a one-cell-width lattice pattern having grids at block-size intervals. In this case, it is desired that the four or more position detection patterns each have an area larger than the blocks.

Consequently, a pattern identical to any of the position detection patterns never appears in the two-dimensional code, making the detection of the position detection patterns easy. In addition, the accuracy of determining light and dark cells in each block is improved. It is desired that the blocks each have, for example, a size of 3×3 cells; the separation space have, for example, a width of one cell; and the four or more position detection patterns each have, for example, a lateral width of four or more cells and a vertical length of four or more cells.

It is desired that version information blocks and format information blocks be arranged in the vicinity of the position detection patterns.

In a method of analyzing the above-described two-dimensional code comprising four or more different position detection patterns from a taken image thereof, after the four or more different position detection patterns are identified and the positional relationships of the thus identified four or more different position detection patterns are verified, projective transformation of the image of the two-dimensional code is performed based on the thus verified positional relationships and the thus projective-transformed image of the two-dimensional code is then analyzed. When two or three of the four or more different position detection patterns are identified, the position(s) of the remaining position detection pattern(s) is/are estimated based on the positional relationships of the identified two or three position detection patterns, and projective transformation of the image of the two-dimensional code is then performed based on the positional relationships of at least four position detection patterns, including the thus estimated position(s) of the position detection pattern(s).

By this, even when the position detection patterns are partially unrecognizable due to contamination or the like, the possibility of successful analysis is improved.

Further, since two-dimensional codes usually contain a position correction pattern, by also utilizing the position correction pattern in combination for confirmation of the positional relationships of the four or more different position detection patterns and for, when two or three of the position detection patterns are identified, estimation of the position(s) of the remaining position detection pattern(s), the analysis accuracy is improved.

It is also possible to allow an analyzer and a computer to execute the above-described analysis method.

Further, a system for generating the two-dimensional code of the present invention is characterized by comprising: a position detection pattern-arranging means for arranging three different position detection patterns at prescribed positions of a two-dimensional matrix; a base information-arranging means for arranging, in a region of the two-dimensional matrix outside the regions where the three different position detection patterns are arranged, a base information region where base information required for analysis of the two-dimensional code is recorded; and a message data-arranging means for sequentially arranging message-recorded data in a region of the two-dimensional matrix outside the regions where the three different position detection patterns and the base information region are arranged. The base information is, for example, version information, format information and design-embedding information, and a position correction pattern and an error correction code may also be included therein.

Effects of the Invention

By using the two-dimensional code of the present invention, even a photographed image of the two-dimensional code on which various deterioration have occurred can be accurately analyzed in a short time, without an increase in the analysis time.

In particular, by using the two-dimensional code of the present invention, even when a plurality of the two-dimensional codes are photographed altogether and the resulting image is analyzed, the photographed image can be analyzed in a short time by adopting a constitution capable of reducing the huge number of the position detection pattern combinations.

Furthermore, even when deterioration such as blurriness or fuzziness occurred on the photographed image in this case, such a photographed image can also be analyzed with high accuracy, without an increase in the analysis time.

BRIEF DESCRIPTION OF THE DRAWINGS

FIG. 4 illustrates pattern examples in which cells are designed to be light or dark according to their respective data in a two-dimensional code having a separation space and in a two-dimensional code without a separation space.

FIG. 5 illustrates the types of data blocks used in the first embodiment.

FIG. 10 illustrates an example of a two-dimensional code generated in accordance with the two-dimensional code of the second embodiment.

FIG. 12 illustrates four position detection patterns of each modification example.

FIG. 21 illustrates checking the shapes of candidate position detection patterns.

MODE FOR CARRYING OUT THE INVENTION

Before describing the embodiments of the present invention, a general two-dimensional code widely used at present will be described.

Figure 1:
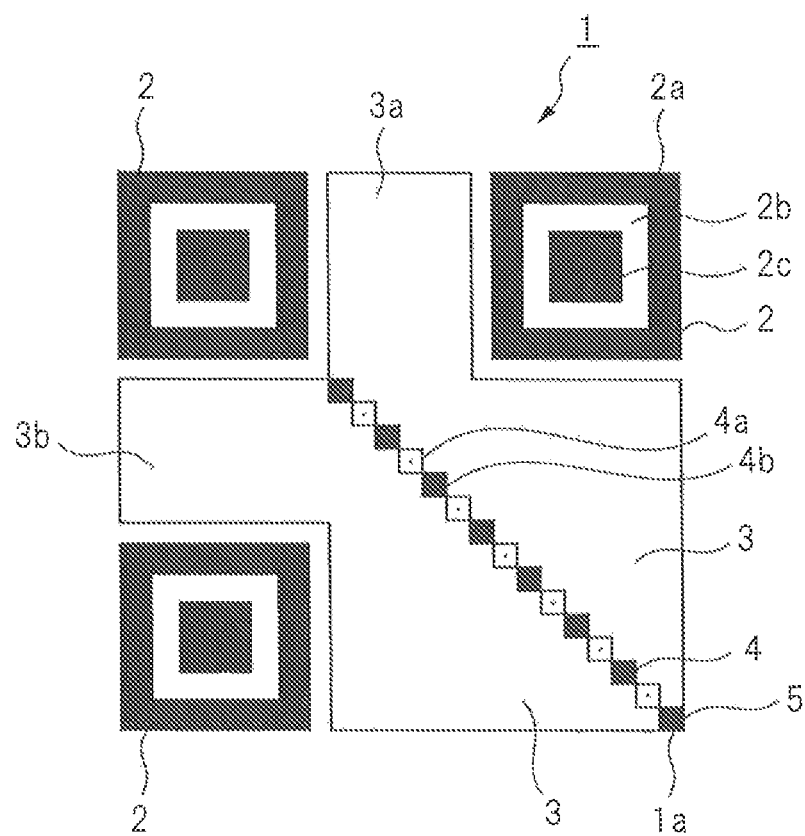
FIG. 1 illustrates the two-dimensional code described in Patent Document 1.

FIG. 1 illustrates the two-dimensional code described in Patent Document 1.

As illustrate in FIG. 1, a two-dimensional code 1 comprises; three position detection patterns (positioning symbols) 2, which are arranged at three corners; and a data region 3. The data region 3 corresponds to a part of the two-dimensional code 1 region that excludes the three position detection patterns 2 and their surrounding spacer parts. Each position detection pattern 2 comprises: dark parts, which are a square frame 2a and a square 2c arranged inside the square frame 2a; and a light part between the frame 2a and the square 2c, which is a square frame 2b. When a scanning line passes through the center of a photographed (taken) image of the position detection pattern 2, the position detection pattern 2 yields a length ratio (frequency component ratio) of dark:light:dark:light:dark=1:1:3:1:1, regardless of the direction of the scanning line. Accordingly, regardless of the rotational orientation of the two-dimensional code, a specific frequency component ratio of the position detection pattern 2 can be detected only by a scanning operation in a certain direction. Thus, the center of the position detection pattern 2 can be easily detected.

The data region 3 comprises bits that are densely arranged in a matrix form, and the bit matrix is divided into: alignment patterns (timing cells) 4, which are used for correction of the positions of the dots within the data region; format information of the two-dimensional code and its error correction signals; version information and its error correction signals; and data part. The alignment patterns 4, the format information of the two-dimensional code and its error correction signals, and the version information and its error correction signals are arranged at prescribed positions on the bit matrix of the code region 3. The remaining part is the data part where coded data are recorded, and the part left after recoding the necessary data is composed of remainder bits. The data bits to be recorded are distinguished from the remainder bits by an end pattern placed at the end of the data bits. The remainder bits, which are referred to as "padding", are a string of light ("1") bits; however, upon being recorded, they are generally subjected to a prescribed processing to be converted into a string of light and dark bits.

The alignment patterns 4 is a string of light and dark bits (dots) used for correction of the positions of the dots within the data region and, as illustrated in FIG. 1, a plurality of the alignment patterns 4 are arranged. The alignment patterns 4 are different from the position detection patterns 2 which detect the reference position of the entire two-dimensional pattern.

In Patent Documents 3 and 4, it is described that bits of the data region 3, which are padding, are utilized to provide a bit image.

A two-dimensional code cannot be recognized unless its position is detected first; therefore, it is important to improve the accuracy of recognizing the position detection patterns. As measures therefore, the following three approaches are considered.

(1) Increase the size of the entire code.
(2) Make the position detection patterns easily recognizable.
(3) Make the position detection patterns correctable. In other words, allow the position detection patterns to have redundancy.

As for the approach (1) of increasing the size of the entire code, due to the designs of paper surfaces on which a two-dimensional code is placed, restrictions on the media (it is desired to place a code on a small component) and the like, the printing space of a two-dimensional code is required to be small, and having a small area is one of the advantages of two-dimensional codes. Thus, the approach of (1) is not desirable.

As for the approach (2) of making the position detection patterns easily recognizable, it is thought to make the position detection patterns easily recognizable by increasing their size relative to the size of the two-dimensional code. However, with the size of the two-dimensional code remaining the same, an increase in the size of the position detection patterns means that much of a decrease in the size of the data region, which leads to a smaller data capacity; therefore, the approach (2) is also not desirable.

Each position detection pattern 2 of the two-dimensional code 1 illustrated in FIG. 1 has a double-layer form comprising a square and a square frame arranged around the square such that a prescribed frequency component ratio can be attained regardless of the direction of the image scanning line. This form itself is advantageous in that it is easily distinguished from other bit patterns; however, when the pattern is small, the light part between the square and the square frame is collapsed and the pattern thus cannot be recognized. Therefore, in order to allow the pattern to be easily recognizable even when its image is out of focus or blur, the pattern is required to have a certain size. Since this leads to a decrease in the size of the data region, the data efficiency is reduced.

In addition, the form and the arrangement of the position detection patterns 2 illustrated in FIG. 1 are devised assuming total scanning and are thus not necessarily considered suitable for execution of efficient analysis in which the detection time of the position correction patterns is short.

When the position detection patterns have a plain (simple) shape, the cell size thereof can be kept small even if their size is relatively increased; however, in this case, projection of the surrounding is likely to be picked up and the possibility of false detection of the position detection patterns is thus increased, leading to an increase in the number of the position detection pattern combinations that need to be checked. Therefore, it is desired that the position detection patterns have such a shape that is simple but unlikely to be affected by image blurriness and fuzziness and can be easily distinguished from other projections.

The approach (3) of allowing the position detection patterns to have redundancy means that, even when a plurality of position detection patterns are arranged and one or more thereof cannot be identified, the reference position (s) of the unidentified position detection pattern(s) in the two-dimensional code is correctable based on the identified other position detection patterns.

For example, in the two-dimensional code 1 of FIG. 1, it is enabled to specify the rotational position of the two-dimensional code by arranging three position detection patterns at three corners without any position detection pattern being arranged at the other corner. However, when even only one of the three position detection patterns cannot be identified, the rotational position of the two-dimensional code cannot be specified and recognition of the two-dimensional code fails. Even if the position detection pattern could be extrapolated, the time required for detection of the two-dimensional code is largely increased and, since accurate coordinates are not likely to be obtained due to photographing at an angle as well as image distortion, blurriness and the like, the accuracy of data extraction is largely affected.

An increase in the number of the position detection patterns enables to correct the reference position of the position detection pattern. For example, when there are five or more position detection patterns, even if one of them is missing, as long as other four or more position detection patterns can be identified, mapping of the data coordinates (determination of the positional relationship between the image and the code) can be carried out with high accuracy.

A larger number of the position detection patterns results in higher redundancy as well as superior tolerance to contamination and the like. However, it also means that not only the number of the combinations to be examined is increased and the processing time is extended, but also the area occupied by the position detection patterns in the two-dimensional code is increased and the data efficiency is thus reduced.

The position detection patterns 2 of FIG. 1 can yield a prescribed frequency component ratio regardless of the direction of the image scanning line; however, when their shape is changed, the prescribed frequency component ratio cannot be obtained. Thus, it is required that the three position detection patterns 2 all have the same shape. Accordingly, in order to allow the position detection patterns 2 of the two-dimensional code 1 illustrated in FIG. 1 to be different from each other, it is necessary to change their size. The position detection patterns 2 are naturally large because they have a square and a square frame arranged therearound. Thus, in order to change the size of three or four of these patterns such that they can be determined to be different from each other in image recognition, it is required that the smallest pattern still have a certain size, and the largest pattern is very large. In this manner, the position detection patterns 2 of FIG. 1 are not suitable for having redundancy.

When imparting redundancy to position detection patterns, it is desired to take into consideration not only a case where one of the position detection patterns cannot be identified, but also a case where two or more thereof cannot be identified. Patent Document 2 describes a two-dimensional code in which one large position detection pattern having a square and a square frame arranged therearound and three small position detection patterns each having a square frame are arranged at four corners and one small position detection pattern is arranged in the center. Since the small position detection pattern in the center has little contribution to the mapping of data coordinates, a case of not using this position detection pattern is considered. In this case, when the one large position detection pattern and one of the three small position detection patterns cannot be identified and only two of the small position detection patterns are identified, the data coordinates cannot be mapped.

As described above, when redundancy is imparted to position detection patterns, the redundancy is improved as the number of different position detection patterns is increased.

Embodiments of the present invention will now be described.

Figure 2:
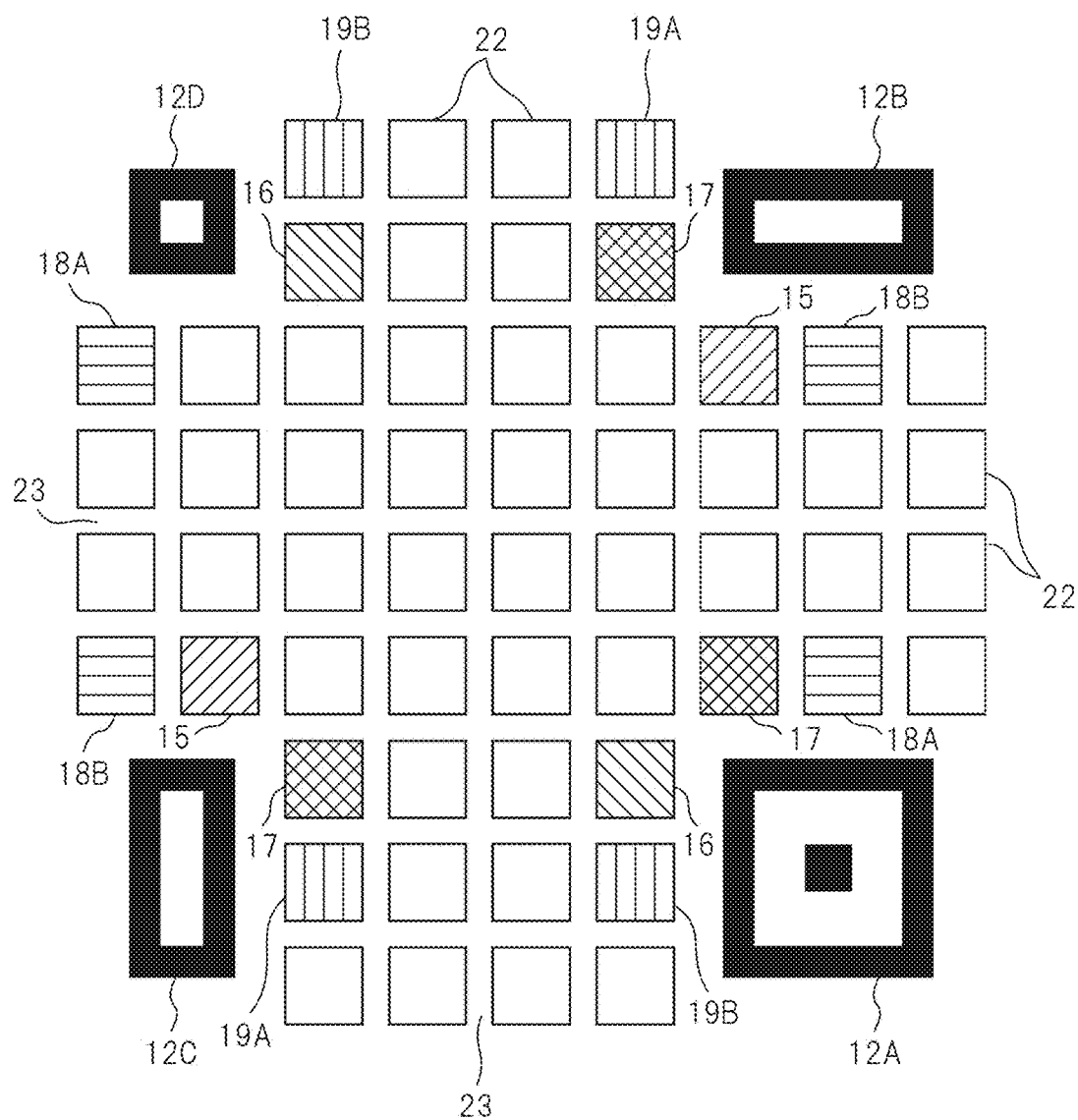
FIG. 2 illustrates a two-dimensional code according to the first embodiment.

FIG. 2 illustrates a two-dimensional code according to the first embodiment.

The two-dimensional code of the first embodiment has a size of 35×35 cells and is divided into 9×9 blocks, with a one-cell light separation space 23 being arranged between adjacent blocks. Accordingly, the separation space is an 8×8, one-cell-width lattice pattern having grids at block-size intervals. A first position detection pattern 12A is arranged in the part of the lower right 3×3 block and 3×3 separation space; a second position detection pattern 12D is arranged in the part of the upper left 2×2 block and 2×2 separation space; a third position detection pattern 12B is arranged in the part of the upper right 3 (lateral)×2 (vertical) block and 3×2 separation space; and a fourth position detection pattern 12C is arranged in the part of the lower left 2 (lateral)×3 (vertical) block and 2×3 separation space. Accordingly, in the two-dimensional code, no pattern other than the first to the fourth position detection patterns appear in the blocks, except in those where the first to the fourth position detection patterns are arranged.

The minimum unit of a code part of a two-dimensional code is a cell. Two-dimensional codes usually take a square or rectangular shape. A two-dimensional code can also take other shape; however, two-dimensional codes are mostly tetragonal, and the two-dimensional code of the first embodiment also has a square shape. Still, the shape of the two-dimensional code of the first embodiment is not restricted thereto and may be rectangular or other shape.

Generally, two-dimensional codes represent data with light and dark cells, and the code part of the two-dimensional code of the first embodiment also represents data with light and dark cells. There have been proposed two-dimensional codes whose cells are distinguished by color, such as the one described in Patent Document 2, as well as mirror (laterally reversed)-type two-dimensional codes. The present invention can be applied to such two-dimensional codes; however, in these cases as well, as described below, the two-dimensional codes comprise four or more position detection patterns of different forms.

The two-dimensional code of the first embodiment is a square of 35×35 cells; however, the size thereof can be increased, or the two-dimensional code can have a shape with different vertical and lateral sizes, such as a rectangular shape. A 35×35-cell square two-dimensional code is referred to as "version 2×2". The smallest version is "1×1", which has a cell size of 27×27. It is defined here that a design can be embedded when the vertical and lateral versions are both 2 or higher. The reason why such a restriction of not embedding a design into a code of version 1×1 is implemented is because embedding of a design despite the small data capacity of the code further reduces the data capacity and recognition of the code would consequently yield hardly any data. The two-dimensional code of the first embodiment can be extended in each of the vertical and lateral directions. When the lateral version is 2 and the vertical version is 3, the code is denoted as "version 2×3". An increase in the version by 1 corresponds to an increase in the cell size by 8 and an increase in the block number by 2. Accordingly, a code of version 3×4 has a cell size of 43×51. The version can be selected to be, but not limited to, 1 to 20.

The first position detection pattern 12A has dark cell parts composed of a single-cell-width square frame of 8×8 cells in size and a 2×2 square in the center of the square frame. The second position detection pattern 12D has a dark cell part of a single-cell-width square frame of 4×4 cells in size. The third position detection pattern 12B has a dark cell part of a single-cell-width laterally-elongated rectangular frame of 8×4 cells in size. The fourth position detection pattern 12C has a dark cell part of a single-cell-width vertically-elongated rectangular frame of 4×8 cells in size.

In the first embodiment, the four different position detection patterns are each arranged at the four corners of the square two-dimensional code. The phrase "different position detection patterns" means that the position detection patterns are different in terms of shape, size and arrangement orientation on the two-dimensional code, and also include cases where the position detection patterns have different line width ratios. However, since color is affected by the photographing conditions and the like, color is not included as a subject of the difference, and a difference in a light-dark binary image is considered.

In the first embodiment, the position detection patterns are arranged in the vicinity of each apex of the square or rectangle. This is because, as compared to a case where the position detection patterns are arranged in one spot, the effects of contamination can be more dispersed by arranging them as far as possible from each other. However, the arrangement positions of the position detection patterns are not restricted to the four corners. As in the first embodiment, by using not only square position detection patterns but also rectangular ones, their shapes, tilt angles and sizes can be easily distinguished, so that the position detection patterns can be quickly recognized. In addition, since hollow rectangles are easily distinguished from other projected images, the data loss is small.

As for the reason why the four position detection patterns are arranged, in two-dimensional projective transformation used for calculating the mapping of the data coordinate with high accuracy in analysis, in order to calculate the coordinate of the code cells and photographed (taken) image corresponding to the cells, it is required that a set of four coordinate be provided as a parameter. Even when only two or three position detection patterns are arranged, projective transformation can be carried out by calculating four points with interpolation of coordinate; however, since precise coordinate are not likely to be obtained due to tilted image capturing, image distortion, blurriness and the like and this greatly affects the accuracy of data extraction, four position detection patterns are arranged in the first embodiment.

Further, the reason why the position detection patterns are different from each other is because, even if a position detection pattern were not recognized, the unrecognized position detection pattern can be surely identified, and this enables estimation the coordinates of the unrecognized position detection pattern and, hence, correction of the position detection pattern. When all the same position detection patterns are used, the identification of an unrecognized position detection pattern is not as easy as in a case of using position detection patterns that are all different, and correction of the position detection pattern is thus difficult.

In the two-dimensional code, 56 blocks other than those of the four position detection patterns constitute the data region, comprising: actual data blocks; error correction code blocks; version information blocks; format information blocks; and design-embedding information blocks.

As described above, each block of the data region is constituted by 3×3 cells and data is embedded block by block. The data region comprises: version information blocks 15 and 16; format information blocks 17; and design-embedding information blocks 18A, 18B, 19A and 19B, with the remaining blocks being actual data blocks 22. As described below, in the first embodiment, some of the actual data blocks 22 are utilized for error-correcting codes and position correction patterns.

Accordingly, the blocks 22, remaining after excluding therefrom the position detection patterns, version information blocks, format information blocks, design-embedding information blocks, blocks in which a position correction pattern is arranged and error correction code blocks, are the actual data blocks. When a design is embedded, a design-embedded block(s) indicated by the design-embedding information blocks is/are also excluded from the actual data blocks. In the blocks belonging to the actual data blocks, the actual data are recorded in such a manner that the actual data are sequentially filled from the upper left to the right side and, once a row of blocks are filled, the actual data are then filled into the next lower row of blocks sequentially from the left.

The blocks each have a size of 3×3 cells with each cell representing one light or dark bit, and each block thus stores a maximum of 9-bit information (9-bit expression). In order to improve the tolerance to image blurriness and fuzziness, the data capacity per block can be set to be smaller than 9 bits. In the first embodiment, the blocks were set to have a size of 3×3 cells; however, the block size is not restricted thereto. The blocks can also have a size of 1×1 cell, which is the minimum size, or a size in which, for example, the vertical and lateral cell sizes are different.

The version information blocks record information on the size of the two-dimensional code. There are two types thereof, which are vertical version information blocks 15 and lateral version information blocks 16, and each of them records the corresponding version information. By arranging two vertical version information blocks 15 and two lateral version information blocks 16, each type of which blocks records the same information, at two distant spots, the risk of a defect caused by contamination or the like is dispersed. As version information, blocks representing a numerical version number (from 1 to 20 for each of the vertical and lateral directions) are arranged.

Each format information block 17 records format information composed of a design-embedding flag (1 bit) and data-block-type data (2 bits), and three format information blocks 17 all storing the same information are arranged at three spots. The design-embedding flag indicates the presence or absence of an embedded design, i.e. whether or not a design-embedding region is arranged. When a design is embedded, design-embedding information blocks are arranged. The data-block-type data indicates the type of the data blocks, which means the data capacity per block and is selected to be 6, 7 or 9 bits/block. The data capacity decreases in the order of 9-bit, 7-bit and 6-bit expressions (9 bits>7 bits>6 bits); however, the data can be more easily read out in the order of 6 bits>7 bits>9 bits. The type of the data blocks is thus selected taking into consideration the level of image blurriness and fuzziness as well as the data capacity. This point will be described later.

A design is embedded block by block and, when a plurality of adjacent blocks constitute a design-embedding region, the separation spaces between the blocks are also included in the design-embedding region. The design to be embedded has a tetragonal external shape, and the image thereof may be any image, without being restricted to a cell-resolution binary image. Further, a plurality of tetragonal blocks may be provided for embedding a design therein. For example, the design may be a multi-valued image having a higher resolution than the cells or a color image, or the design may be, of course, a cell-resolution binary image. In the first embodiment, as a restriction on embedding of a design, it is prescribed that no design be embedded into the two upper block rows, two left block columns, three lower block rows and three right block columns of the code. In these areas outside the design-embedding region, depending on the specification of the two-dimensional code, design-embedding information blocks having image information are arranged.

The design-embedding information blocks record information pertaining to the size of the region where a design is embedded as well as the positions of the blocks therefore in either the vertical or lateral direction. There are two types of design-embedding information blocks, which are vertical-embedding information blocks 18A and 18B and lateral-embedding information blocks 19A and 19B, and each of them records the corresponding version information. The vertical-embedding information blocks 18A and 18B record the height of the embedded design (3 bits or 6 bits) and the offset height of the embedded design (3 bits or 6 bits). The lateral-embedding information blocks 19A and 19B specify the width of the embedded design (3 bits or 6 bits) and the offset width of the embedded design (3 bits or 6 bits). Whether 3-bit information or 6-bit information is recorded depends on the version information as described below. When the version is 2 to 4, 3-bit information is required; when the version is 5 to 20, 6-bit information is required; and when the version is 2 to 4, the vertical-embedding information block 18B and lateral-embedding information block 19B are not necessary.

The design-embedding information blocks exist only when a design-embedding flag is waved in a format information block. The first embodiment assumes a case where only one design is embedded. When it is assumed to embed plural designs into plural regions, the bit number of the design-embedding flag is increased in the format information block so as to indicate the number of design-embedding regions and, at the same time, the design-embedding information block is arranged as many as the number of the designs. The size of each design and the position at which embedding of the design begins are specified at a block level. The block coordinates are expressed as "(n,m)" with the block in the upper left corner being the origin, and the number of lateral blocks and that of vertical blocks are expressed as "b1W" and "b1H", respectively. In the first embodiment, the design-embedding region is restricted to a rectangular region formed by an upper left corner (2,2) and a lower right corner (b1W-4, b1H-4). Accordingly, the maximum number of lateral blocks of a design is b1W-5 and the maximum number of vertical blocks of a design is b1H-5.

With regard to the position of a design, by embedding the information on the block coordinates of the starting point (upper left) and the block size into the code as design-embedding information blocks, the position of the embedded design can be recognized when the code is analyzed. In the same manner as in the case of the version information blocks, the lateral and vertical information blocks are handled separately. Different data capacities are assigned between cases where b1W-5 is less than 8 (lateral version of 2 to 4) and other cases (lateral version of 5 to 20), and the vertical information blocks are handled in the same manner. The values of b1W and b1H are determined by analyzing the lateral and vertical versions, respectively.

When the value of b1W is less than 13, the lateral block size has a minimum of 1 block and a maximum of 8 blocks, and these 8 block sizes can all be represented by 3 bits. In the same manner, the number of the lateral offset blocks has 7 possibilities, which are 2 to 8, and these 7 numbers can also be represented by 3 bits; therefore, the total data capacity is 6 bits. Accordingly, these lateral block data are represented by 6 bits, which can be expressed using a single block. The same also applies to the vertical blocks. Meanwhile, when the value of b1W is 13 or larger, the lateral block size is represented by 6 bits and, in the same manner, the number of the lateral offset blocks is also represented by 3 bits. Accordingly, these lateral block data are expressed using two blocks. The same also applies to the vertical blocks.

The lateral-embedding information blocks 19A and 19B are both arranged outside (in the upper and lower sides of) the upper-left and lower-right lateral version information blocks, and the vertical-embedding information blocks 18A and 18B are arranged outside (in the left and right sides of) the lower-left and lower-right vertical version information blocks.

When no design is embedded, i.e. when the design-embedding flag of the format information block indicates "null", the design-embedding information blocks and the region for embedding a design are no longer necessary, making the code efficient.

The position correction patterns are used for the purpose of correcting the coordinate of the actual data blocks and error correction code blocks, as well as the coordinate of the design-embedding information blocks when a design is embedded. In the two-dimensional code, these coordinate can be approximately obtained from the position detection patterns; however, since errors occur in the coordinate of the data region due to twisting or bending of the paper, distortion of the lens or displacement during acquisition of the position detection patterns, the position correction patterns are arranged for correcting such errors. The position correction patterns are different from the position detection patterns in that they do not have to be distinguished from other noises, and the positions of the position correction patterns are easily determined as long as the position detection patterns can be calculated. Therefore, it is desired that the position correction patterns have such a form that enables fine coordinates corrections.

In the first embodiment, as position correction patterns, blocks composed of a combination of predetermined cells (position correction blocks) are arranged at regular intervals in place of actual data. If a block coordinates (7n,7m) (wherein, n and m are each an integer of 0 or larger) is in the data region, a block in which a dark central cell is surrounded by light cells is arranged at the coordinates. However, should a position detection block, a version information block, a format information block, a design-embedding information block or a design exist at the coordinates, no position correction block is arranged. Here, the block coordinates are expressed by defining the coordinates of the upper-left block as the reference coordinates (0,0), with the coordinates of the adjacent block on the right being (1,0). It is noted here that the block in which the position correction patterns are arranged is not restricted to the above-described one.

As the actual data, segments each composed of a combination of a message and a header modifying the message (message type (message encode) message size) are arranged as many as the number of the messages. In addition, as a special segment, a segment which contains only an end flag without any message is generated and, when a capacity of the actual data is left unused, this end-flag segment is arranged, followed by padding. The actual data are divided into block units in accordance with the data capacity per block which is indicated by the data-block-type data. In the same manner, the error-correcting codes are also divided into block units.

When Reed-Solomon codes are used as the error-correcting codes, since the error corrections are performed word by word, it is desired that one word constitutes one block. When one word spans over a plurality of blocks, even if only one of the blocks is contaminated, all of the words associated with the block are subjected to the error correction, which impairs the correction efficiency. Contamination and spot-light-caused color fading that lead to corrections are often concentrated in one spot. The division of the actual data into blocks has an effect of putting together the data to be simultaneously corrected into one spot, and this enables efficient corrections and improves the probability of the code to be recognized.

As described above, the two-dimensional code of the first embodiment comprises the separation space 23 of a single cell in width, which is arranged between the blocks. Therefore, the position detection patterns and the blocks are all surrounded by light cells.

Figure 3:
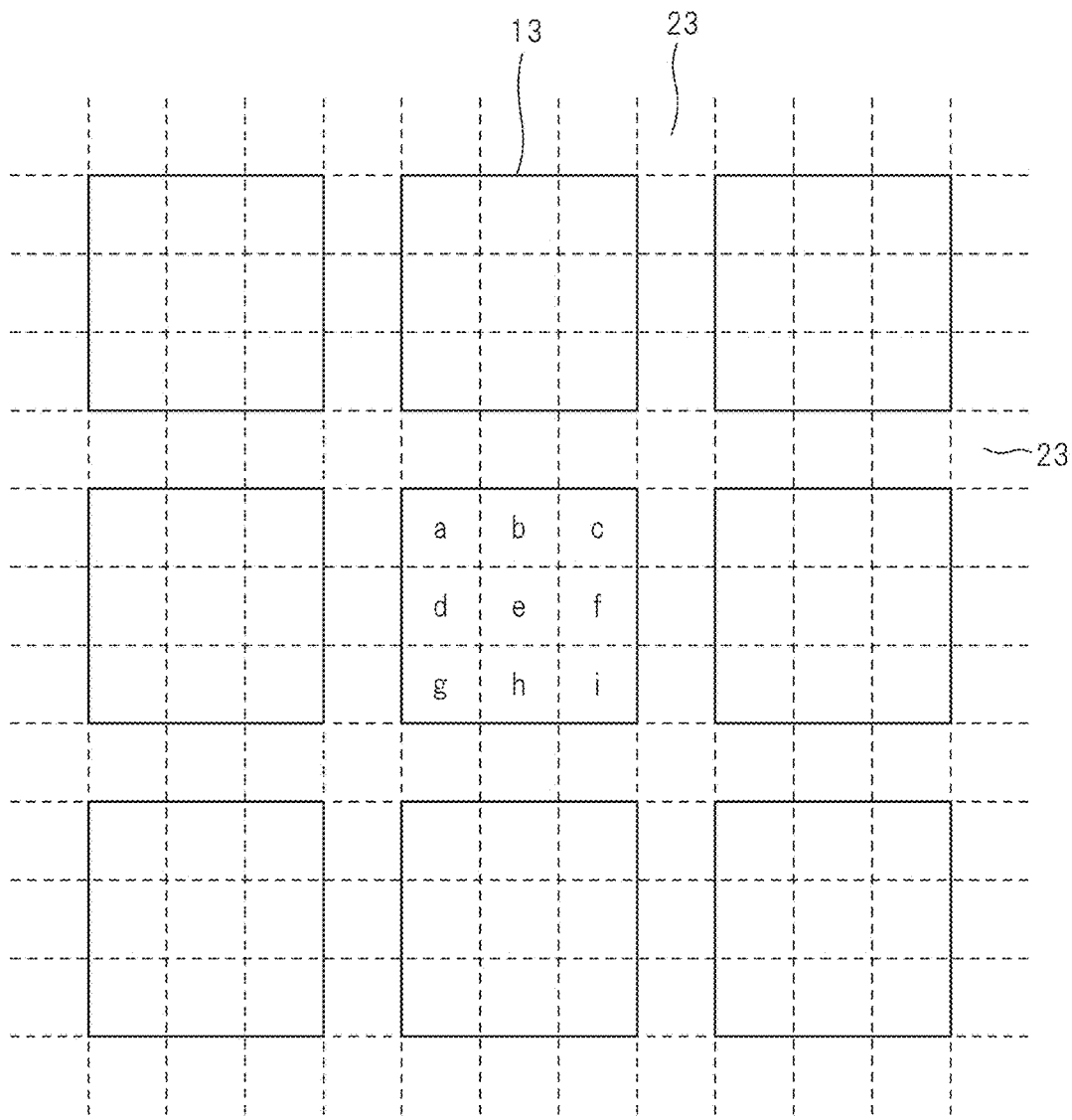
FIG. 3 illustrates the arrangement of plural blocks in the two-dimensional code of the first embodiment.

FIG. 3 illustrates the arrangement of plural blocks in the two-dimensional code of the first embodiment. Each block has a size of 3×3 cells, and the peripheries of the blocks are separated by the separation space 23 of a single cell in width.

FIG. 4 illustrates pattern examples in which cells are designed to be light or dark according to their respective data in a two-dimensional code having the separation space 23 and in a two-dimensional code without the separation space 23. FIG. 4(A) illustrates a two-dimensional code comprising the separation space 23 and four blocks of 3×3 cells in size, wherein three of the blocks are patterns in which cells that are positioned in the center and at four corners are dark and other cells are light and one of the blocks is a pattern in which the light and dark cells of the other three blocks are reversed, and FIG. 4(B) illustrates the two-dimensional code of FIG. 4(A) without the separation space 23. As illustrated in FIG. 4(B), without the separation space 23, the boundaries between the blocks are unclear and the light cells surrounded by dark cells may be blackened out.

As compared to the two-dimensional code without the separation space 23, the two-dimensional code having the separation space 23 is larger and thus has a lower data efficiency; however, since it is not likely to be affected by the patterns of the adjacent blocks even when its photographed image is out-of-focus or blur, the accuracy of light-dark determination of each cell is improved. In fact, when an image of the two-dimensional code having the separation space 23 and that of the two-dimensional code without the separation space 23 are both subjected to binarization, blackening-out of cells is more likely to occur in the latter image. When the photographed image is out-of-focus or blur, the cells are each affected by the color of the surrounding cells. In FIG. 4(B), whether a surrounding cell of a given cell is light or dark is substantially random. Those cells surrounded by cells with largely different colors are greatly affected and vice versa, and such non-uniformity of the effects of the surrounding cells makes color determination difficult. Explaining the cells constituting a block by assigning them with letters "a" to "i" as illustrated in FIG. 3, because the two-dimensional code of FIG. 4(A) has the separation space 23, the cells a, c, g and i are in contact with the separation space at five of the eight peripheral spots and the cells b, d, f and h are in contact with the separation space at three of the eight peripheral spots. Thus, it can be said that the cells other than the cell e are less likely to be affected by their surrounding cells as compared to the case of FIG. 4(B). In addition, by allowing each block to have 6-bit expression as described below, cell e, which is likely to be affected, is no longer evaluated and, since the cells a, c, g and i are now in contact with a light cell at six of the eight peripheral spots and the cells b, d, f and h are in contact with the a light cell at four of the eight peripheral spots, it can be said that the cells are further less likely to be affected by image blurriness or fuzziness.

In this manner, by arranging the separation space 23, the risk that the cells may not be properly recognized due to blurriness or fuzziness can be reduced.

As for the position detection patterns, even the smallest second position detection pattern 12D is a square of 4×4 cell in size and the blocks of 3×3 cells in size are separated by the separation space 23, a pattern identical to any of the position detection patterns does not appear in the data block. Therefore, by arranging the separation space 23, the detection process of the position detection patterns can be easily carried out.

In the first embodiment, the data capacity per block can be selected separately for each type in accordance with the resistance to data deterioration.

FIG. 5 illustrates the types of data blocks used in the first embodiment.

FIG. 5(A) illustrates a data type in which bits "a" to "i" are assigned to each of 3×3 cells of a block so that 9 bits can be expressed. In this case, one block has an information capacity of 9 bits and is capable of expressing a value up to $2^9$=0 to 511.

When analyzing the data type of FIG. 5(A), for a binary image generated from an input photographed image, the coordinate corresponding to the respective cells in the image are calculated and it is determined whether the value of the pixel of each coordinates is light ("1") or dark ("0") to obtain a 9-bit value per block. A method of converting a photographed image into a binary image will be described later.

FIG. 5(B) illustrates a data type in which the center of 3×3 cells of a block is fixed to be "1" (light) and its surrounding eight cells j1 to j8 are designed to include four light ("1") cells and four dark ("0") cells. In this case, one block has an information capacity of $_8C_4$=70 patterns, which is about 6 bits (6-bit expression).

FIG. 5(C) illustrates a data type in which the center of 3×3 cells of a block is fixed to be "0" (dark) and its surrounding eight cells j1 to j8 are designed to include four light ("1") cells and four dark ("0") cells. In this case as well, one block has an information capacity of $_8C_4$=70 patterns, which is about 6 bits (6-bit expression).

When the data type is 6-bit expression, both (B) and (C) can be used; however, the same data type is used on the encoding and decoding sides.

When analyzing the data type of FIG. 5(B) or (C), for a gray-scale image generated from an input photographed image, the coordinate of the cells j1 to j8 in the photographed image are calculated to obtain gray-scale pixel values of the respective cells, which are then sorted in the descending order. In this case, the four light cells have high pixel values and the four dark cells have low pixel values. A method of converting a photographed image into a gray-scale image will be described later.

It is demanded that a two-dimensional code be recognized under a variety of photographing environments. Light has adverse effects on photographed images, such as localized color changes and gradual color changes, and these effects are the factors that make it difficult to generate an appropriate binarized image from a photographed image.

This method is advantageous in that it does not require a binary threshold. The method has an effect of enabling to determine whether cells are light or dark based on the relationships of the relative pixel values of the cells, even without deriving a binary threshold. In addition, also against localized strong color changes caused by a spotlight or the like, since relevant cells are clustered into blocks and this increases the probability of all of the cells to be uniformly affected, even if the cells are entirely whitened, the relationships of their relative pixel values are maintained, so that the code is highly like to be recognized.

In FIGS. 5(B) and (C), the central cell can be arbitrarily set to have a value of "1" (light) or "0" (dark), and a data type in which the surrounding eight cells j1 to j8 are designed to include four light ("1") cells and four dark ("0") cells is also possible. In this case, one block has an information capacity of $_8C_4 \times 2 = 140$ patterns, which is about 7 bits (7-bit expression).

In the analysis method of this data type, the analysis of the surrounding cells is carried out in the same manner as in the case of 6-bit expression. In addition, in the analysis of the center pixel, the pixel value of the cell having the lowest pixel value among the four points with high pixel values and the pixel value of the cell having the highest pixel value among the four points with low pixel values are defined as G1 and G2, respectively, and the coordinates of the cell in the center of the block in the photographed image is calculated. When the thus obtained pixel value is not smaller than (G1+G2)/2, the central cell is determined to be a light cell. Otherwise, the central cell is determined to be a dark cell.

In this method, since the evaluation of the central cell utilizes a threshold value obtained from the analysis of the adjacent cells and it is highly likely that the central cell and its adjacent cells are subjected to substantially the same effects of the photographing environment, the code can be recognized with high accuracy.

In FIGS. 5(D1) to (D8), in each block, the central cell is fixed to be light or dark (it is fixed to be light ("1") in these figures) and its surrounding eight cells are composed of four cells each of light and dark, with each of the eight cells being fixed to be light, dark, dark, light, light, light, dark and dark in the clockwise order, and the data extraction starts at the position of an isolated light cell. In this case, since 8 patterns can be extracted, the data capacity is 3 bits (3-bit expression). In order to detect the position of the isolated light cell in this pattern, an arithmetic processing in which, from the cell at the starting position, the brightness value of each cell is added, subtracted, subtracted, added, added, added, subtracted and subtracted in the clockwise direction, is performed while sequentially rotating the starting position, and the starting position which yields the maximum arithmetic result is thereby determined. The thus determined starting position is the position of the isolated light cell. This arithmetic processing can also be performed in the same manner with the light and dark cells being reversed and, in this case, the starting position which yields the minimum arithmetic result is determined.

As described above, in the first embodiment, according to the data-block-type data (2 bits) in the format information blocks 17, any one of the above-described 9-bit expression, 7-bit expression and 6-bit expression is selected. If necessary, 3-bit expression may also be included in the selectable expressions.

In the first embodiment, the version information blocks and format information blocks, which record important information, utilize a 20-pattern-expression data type, which will now be described.

Figure 6:
FIG. 6 illustrates 20-pattern-expression data type.

FIG. 6 illustrates 20-pattern-expression data type.

In FIG. 6, a reference number 31 represents a 20-pattern-expression data block, and a reference number 32 represents any one of the first to fourth position detection patterns. As illustrated in FIGS. 6(A) and (B), in the data block 31 arranged below or above the position detection pattern 32, the cells of the center column in the vertical direction are fixed to be dark-light-dark (0, 1, 0), and the data are expressed by 6 bits of the cells m1 to m6 in the two columns on each side. Further, by assigning 3 bits of the 6 bits to be light and other 3 bits to be dark, $_6C_3 = 20$ patterns are expressed. The cell data of the blocks illustrated in FIGS. 6(A) and (B) are detected by scanning the blocks in the vertical direction. Further, as illustrated in FIGS. 6(C) and (D), in the data block 31 arranged to the right or left of the position detection pattern 32, the cells of the center column in the lateral direction are fixed to be dark-light-dark (0, 1, 0), and the data are expressed by 6 bits of the cells m1 to m6 that are in the two columns above and below the center column. By assigning 3 bits of the 6 bits to be light and other 3 bits to be dark, $_6C_3 = 20$ patterns are expressed. The cell data of the blocks illustrated in FIGS. 6(C) and (D) are detected by scanning the blocks in the lateral direction.

By using this data type, even in a condition where the code version and the cell size are unclear in the analysis, as long as the position of a position detection pattern in a photographed image is determined, data can be extracted from the data blocks. When the version and the cell size are unclear, even if the coordinates of a position detection pattern in a photographed image is known, the data block coordinate cannot be calculated. However, data blocks can be found by scanning in the direction from a position detection pattern toward its adjacent position detection pattern (the first and second position detection patterns are adjacent to the third and fourth detection patterns). In FIG. 6(A), scanning is performed toward the center of the data block in the direction perpendicular to the lower side of the position detection pattern represented by the reference number 32. The scanning starts immediately below the position detection pattern, first hitting the dark cell on the upper side of the center column. Continuing the scanning, the scanning line hits the light cell, then the dark cell, and finally the light cells of the separation space. By this, the coordinate of the cells in the center column and the number of pixels per cell of the data block can be calculated. Consequently, the coordinates of other cells in the data block are also easily determined, so that the data represented by the data block can be obtained.

The version information blocks and format information blocks are data blocks that are important in the analysis process. A 20-pattern expression is carried out by arranging these data blocks to have such positional relationships with respect to each position detection pattern as illustrated in FIG. 6. As a measure against contamination and localized noises caused by a spotlight or the like, the same information is maintained in the information blocks at two spots and in the format information blocks at three spots.

Figure 7:
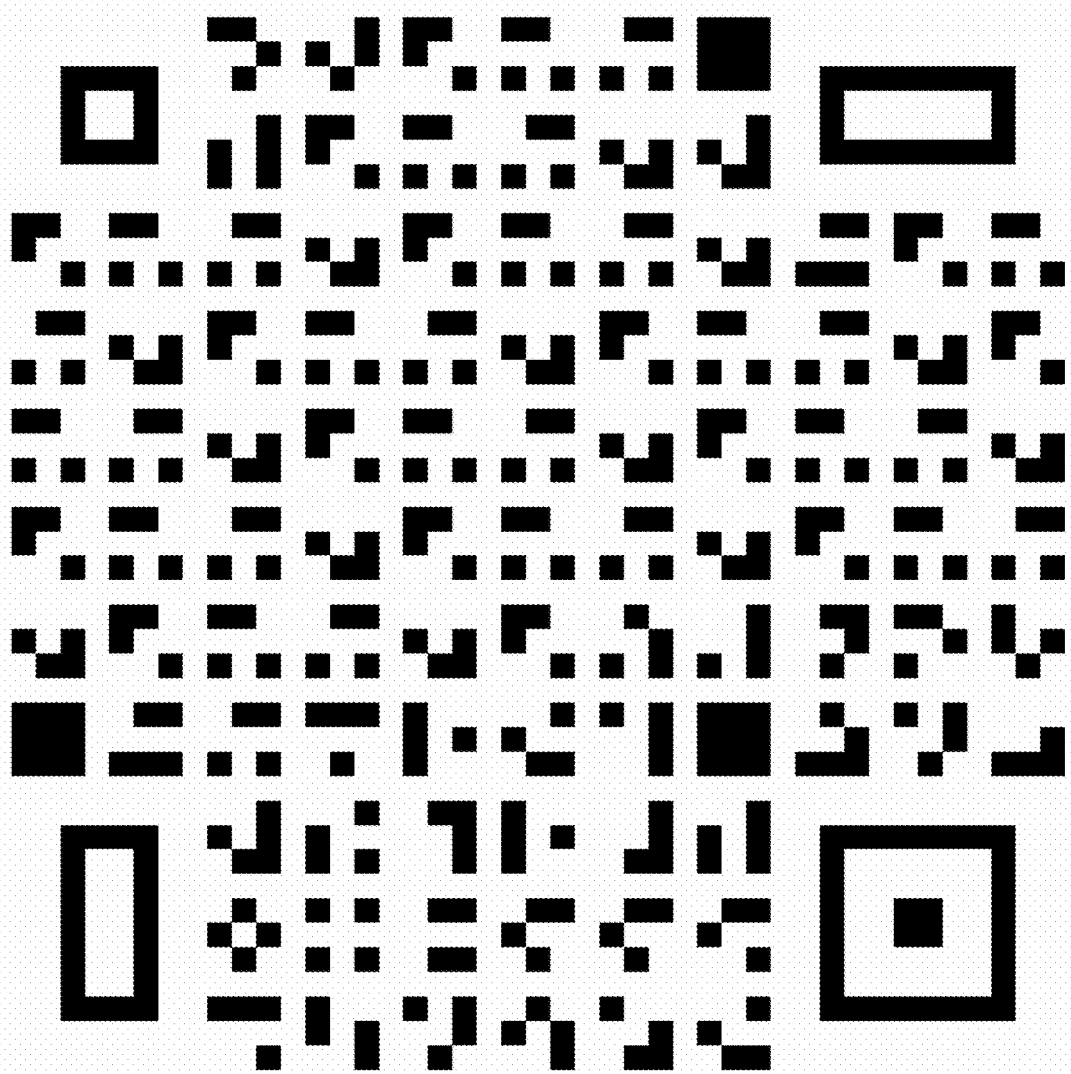
FIG. 7 illustrates an example of a two-dimensional code generated in accordance with the two-dimensional code of the first embodiment.

FIG. 7 illustrates an example of a two-dimensional code generated in accordance with the two-dimensional code of the first embodiment. The two-dimensional code of FIG. 7 is a 11×11 block two-dimensional code having 43×43 cells, and its version is 3×3. The two-dimensional code of FIG. 7 does not have any design region, and no design is embedded therein. Therefore, no design-embedding information block is necessary.

Figure 8:
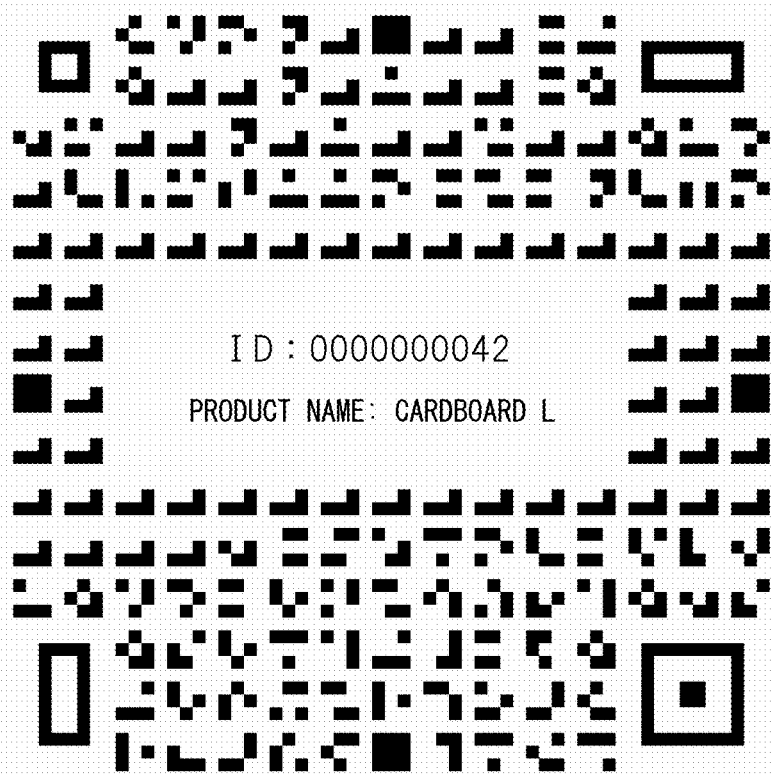
FIG. 8 illustrates another example of a two-dimensional code generated in accordance with the two-dimensional code of the first embodiment.

FIG. 8 illustrates another example of a two-dimensional code generated in accordance with the two-dimensional code of the first embodiment. The two-dimensional code of FIG. 8 is a 15×15 block two-dimensional code having 59×59 cells, and its version is 5×5. The two-dimensional code of FIG. 8 contains a rectangular design region having diagonal corners at block coordinates of (2,5) and (11,8), in which design region an image describing an ID code and a product name is placed. By this, users can discriminate the outline of the subject to be recognized even before the code is recognized.

The position detection patterns, those having various shapes can be used, and the two-dimensional code can also take a variety of sizes and the like.

Figure 9:
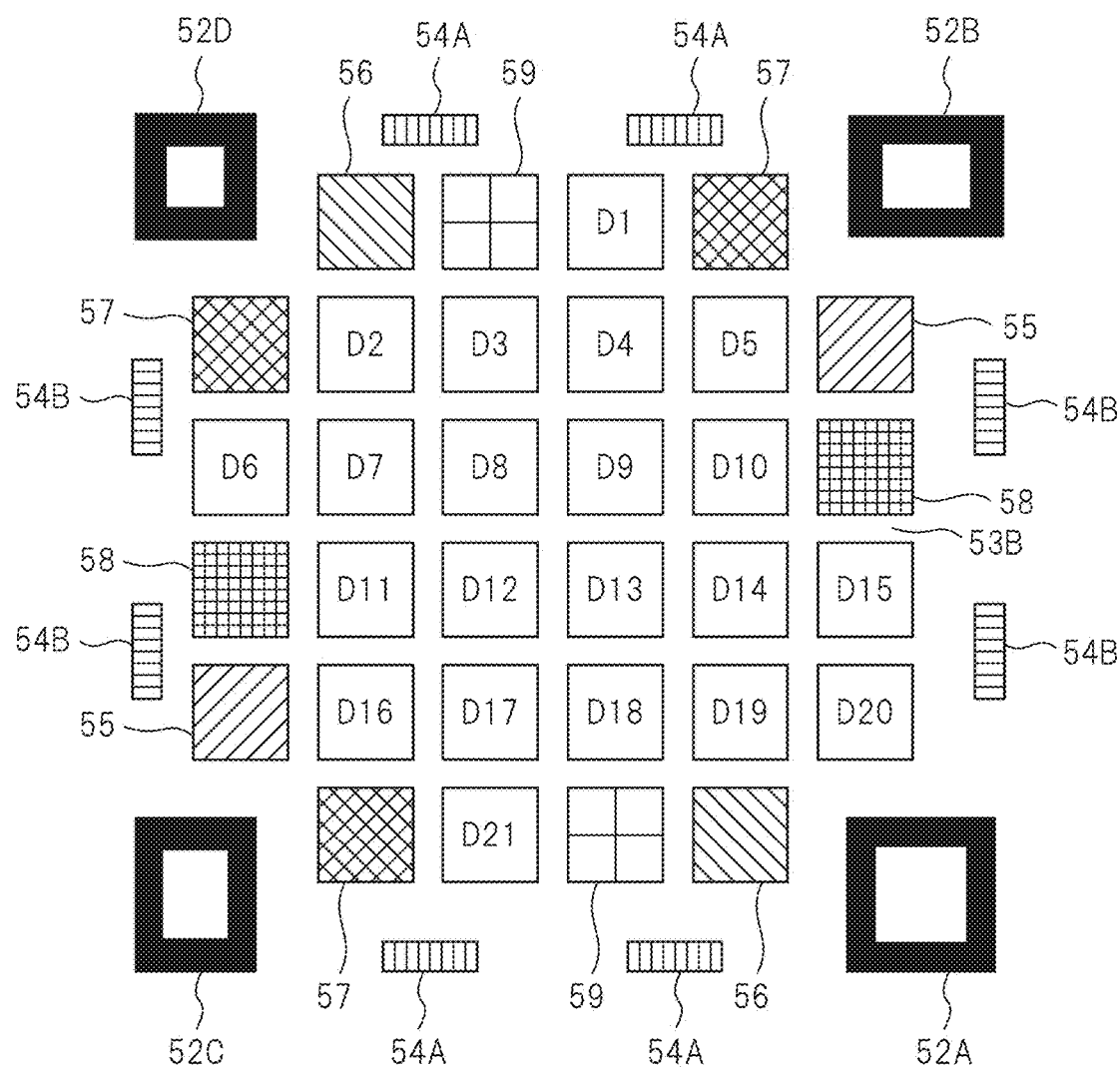
FIG. 9 illustrates a two-dimensional code according to the second embodiment.

FIG. 9 illustrates a two-dimensional code according to the second embodiment. The two-dimensional code of the second embodiment is different from that of the first embodiment in terms of the following points.

(1) A first position detection pattern 52A has only a square frame composed of dark cells with no square being arranged therein. In addition, second and third position detection patterns 52B and 52C both have a rectangular shape that is nearly a square. A fourth position detection pattern 52D has the same shape as that of the position detection pattern 12D of the first embodiment.

(2) The block size and the block constitution are different. Particularly, the block constitution of the outer parts sandwiched between the position detection patterns in both the lateral and vertical directions is different. In these parts, a series of blocks, which are two vertical information blocks 55, two lateral version information blocks 56, three format information blocks 57, two vertical design-embedding information blocks 58, two lateral design-embedding information blocks 59, and position correction patterns 54A and 54B, is arranged. The remaining blocks 60 are composed of actual data blocks, error correction code blocks, blocks having position correction patterns, and design-embedding region (s).

Other parts are the same as those of the first embodiment; therefore, description thereof is omitted.

FIG. 10 illustrates an example of a two-dimensional code generated in accordance with the two-dimensional code of the second embodiment.

FIG. 10(A) illustrates a 8×8 block two-dimensional code having 36×36 cells. The two-dimensional code of FIG. 10(A) contains a rectangular design region having diagonal corners at block coordinates of (2,2) and (5,5), in which design region a high-resolution multi-valued image is placed. This enables the two-dimensional code to have an improved impression and to draw attention.

FIG. 10(B) illustrates a 8×8 block two-dimensional code having 36×36 cells. The two-dimensional code of FIG. 10(B) contains a rectangular design region having diagonal corners at block coordinates of (2,3) and (5,4), in which design region an image of numbers is placed.

There are various sizes and forms of two-dimensional codes and any of them can be applied to the two-dimensional code of the present invention.

Figure 11:
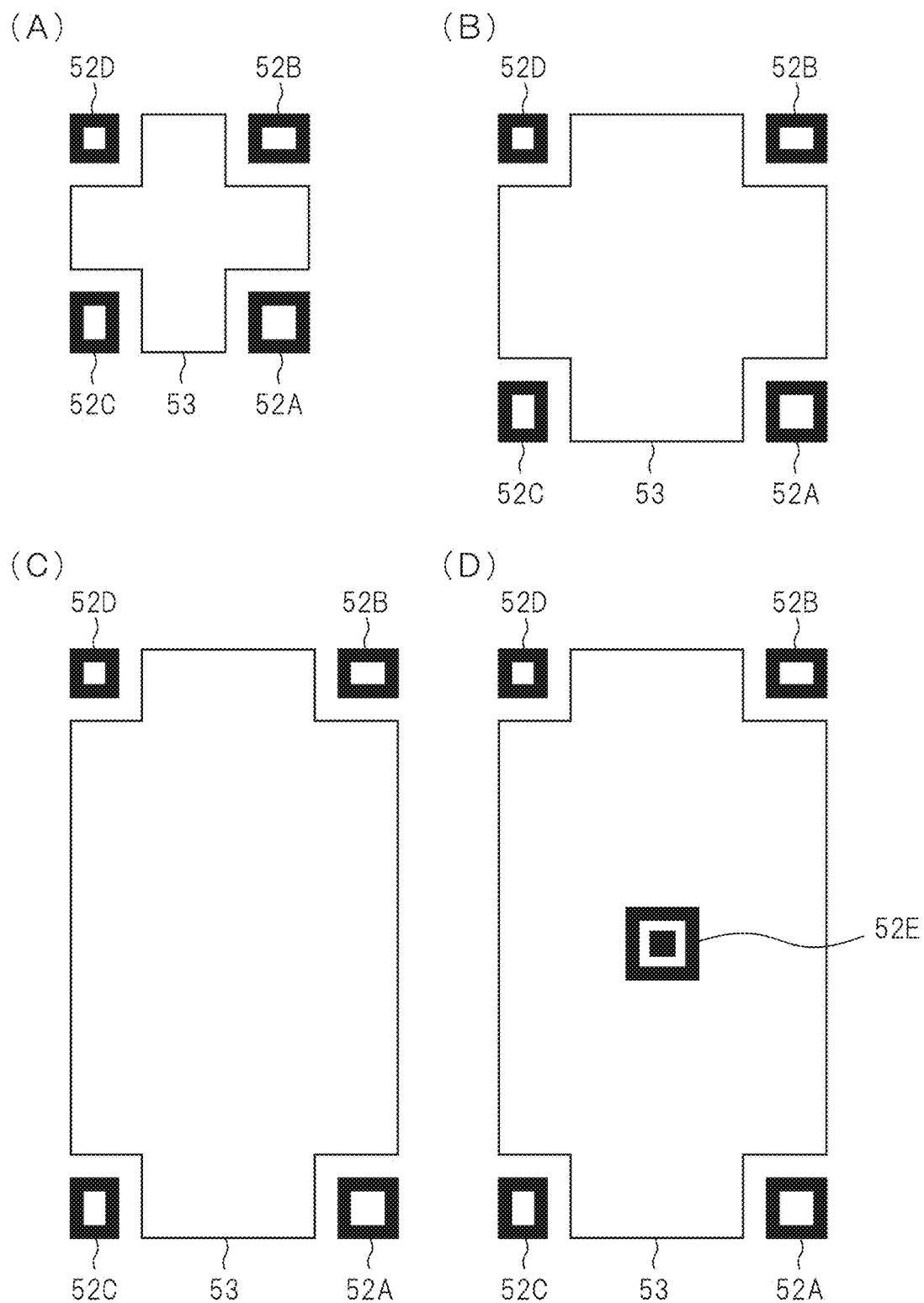
FIG. 11 illustrates modification examples in which the position detection patterns of the two-dimensional code of the second embodiment are applied as two-dimensional patterns of different sizes and shapes.

FIG. 11 illustrates modification examples in which the position detection patterns of the two-dimensional code of the second embodiment are applied as two-dimensional patterns of different sizes and shapes. A reference number 53 represents the data region.

FIG. 11(A) illustrates an example of a square-form small two-dimensional code.

FIG. 11(B) illustrates an example of a two-dimensional code similar to the two-dimensional code of the second embodiment.

FIG. 11(C) illustrates an example of a rectangular two-dimensional code.

FIG. 11(D) illustrates an example of a rectangular two-dimensional code in which a fifth position detection pattern 52E is added in the center. The fifth position detection pattern 52E is in a form similar to that of the first detection pattern 12A of the first embodiment which has a square frame and a square therein.

Preferred forms of the position detection patterns will now be examined.

In the present invention, the following points are desired for the position detection patterns: (1) the four types of position detection patterns can be distinguished from one another based on the shape, size or orientation on the two-dimensional code; (2) the types of the position detection patterns can be distinguished from one another using a simple algorithm; (3) for the thus distinguished position detection patterns, a combination thereof is easily determined (which contributes to high-speed recognition); (4) the position detection patterns have a reduced cell size; (5) the position detection patterns can be easily distinguished from a projected image other than the image of the two-dimensional code; and (6) no other position detection pattern appears within the two-dimensional code.

It can be said that the position detection patterns of FIG. 2 and FIG. 9 satisfy these matters.

Square and rectangular position detection patterns having various combinations of frame width and identification space width, i.e. cell size, were generated. The thus generated position detection patterns were photographed such that the resulting images were blur and fuzzy, and the images were binarized to test whether or not the position detection patterns could be distinguished. Consequently, it was discovered that the position detection patterns could be easily distinguished from other projected images, depending on the presence or absence of an identification space inside the frame; that a single-cell space and a single-cell square therein are easily affected by blurriness; and that the width of the outer frame does not largely affect the tolerance to blurriness.

From these results, it was discovered that a square or rectangular frame having a two-cell identification space inside is useful. The reason for this is believed as follows. In a two-dimensional code in which the smallest cell represents 1 bit, when blurriness or fuzziness occurs over an area of one cell or larger, even if the positions of the patterns could be detected, data cannot be acquired. Under normal photographing conditions, blurriness or fuzziness rarely occurs over an area of one cell or larger; therefore, an identification space of two cells in size can handle single-cell blurriness and fuzziness in all directions.

The second position detection pattern described in the first embodiment, which is a square of 4×4 in cell size, has a constitution of the minimum cell size that has the above-described space.

The first position detection pattern has a constitution in which a single-cell-width frame, a two-cell space and a two-cell square are layered. When the center of this position detection pattern is scanned, regardless of its orientation, a dark-light-dark-light-dark pattern is obtained, which is clearly different from the second position detection pattern and noises.

As for the forms of the third and fourth position detection patterns, it is desired that the frames of the position detection patterns exist on the extension of the frames of other position detection patterns. By this, when a position detection pattern is missing, the accuracy of estimating the coordinates of the missing position detection pattern can be improved.

The forms of the third and fourth position detection patterns of the first embodiment comply with these conditions. Since these position detection patterns are each tilted by 90° and have an aspect ratio that is different from those of the first and second position detection patterns, the third and fourth position detection patterns can be easily distinguished from the first and second position detection patterns.

The second embodiment has a constitution in which the cell size occupied by the position detection patterns is the smallest. The first and second position detection patterns have the same shape but different sizes, with the second position detection pattern having a size of 5×5 cells. For the same reason as described above, the third and fourth position detection patterns are generated.

These position detection patterns have a cell size of 16+64+32+32=144 cells in the first embodiment and 16+25+20+20=81 cells in the second embodiment.

Despite the two-dimensional code illustrated in FIG. 1 has position detection patterns only at three spots, these three position detection patterns have a cell size of 7×7×3=147 cells, which is larger than those of the embodiments of the present invention.

The first embodiment has a larger cell size than the second embodiment; however, the position detection patterns of the second embodiment all have similar areas in size and their detection accuracy is thus likely to be affected when they are photographed at an angle. Meanwhile, in the first embodiment, the first and second position detection patterns have different forms and the third and fourth position detection patterns are in different orientations. The first and second position detection patterns are different from the third and fourth position detection patterns in terms of the aspect ratio. These position detection patterns can be adequately distinguished even when they are photographed at an angle, which is a constitution useful for distinguishing the position detection patterns.

Further, around each of the position detection patterns of FIG. 2, light cells are arranged as a 2-cell blank space. Recognition of the two-dimensional code of FIG. 1 requires a quiet zone around the printed code, and this quiet zone is regarded as a part of the code. In contrast, the accuracy of recognizing the two-dimensional code of the first embodiment is not affected regardless of the type of a print placed around the code. Moreover, as in the second embodiment of FIG. 9, a blank space can also be arranged outside the code in the same manner as for the code of FIG. 1.

Still, in the spirit of the present invention, position detection patterns of other forms can also be used and various modifications can be made.

FIG. 12 illustrates four position detection patterns of each modification example.

FIG. 12(A) illustrates an example where one large circular frame, two elliptical frames with different orientations and one small circular frame constitute four position detection patterns.

FIG. 12(B) illustrates an example where one large circular frame having a small circle inside, two elliptical frames with different orientations and one small circular frame constitute four position detection patterns.

FIG. 12(C) illustrates an example where one large cross, two crosses, which are extended in only one direction but have different directions of the extension, and one small cross constitute four position detection patterns.

FIG. 12(D) illustrates an example where one large L-shaped pattern, two L-shaped patterns, which are extended in only one direction but have different directions of the extension, and one small L-shaped pattern constitute four position detection patterns. These L-shaped patterns are all in the same orientation and their rotational direction can be determined from the corner position. These L-shaped patterns may also be rotated by 90°.

FIG. 12(E) illustrates an example where one large triangular frame, two triangular frames, which are extended in only one direction but have different directions of the extension, and one small triangular frame constitute four position detection patterns.

FIG. 12 illustrates only some of the possible examples, and position detection patterns of other various forms can be used as well.

Next, the process of generating the two-dimensional codes of the first and second embodiments (encoding process) will be described.

Figure 13:
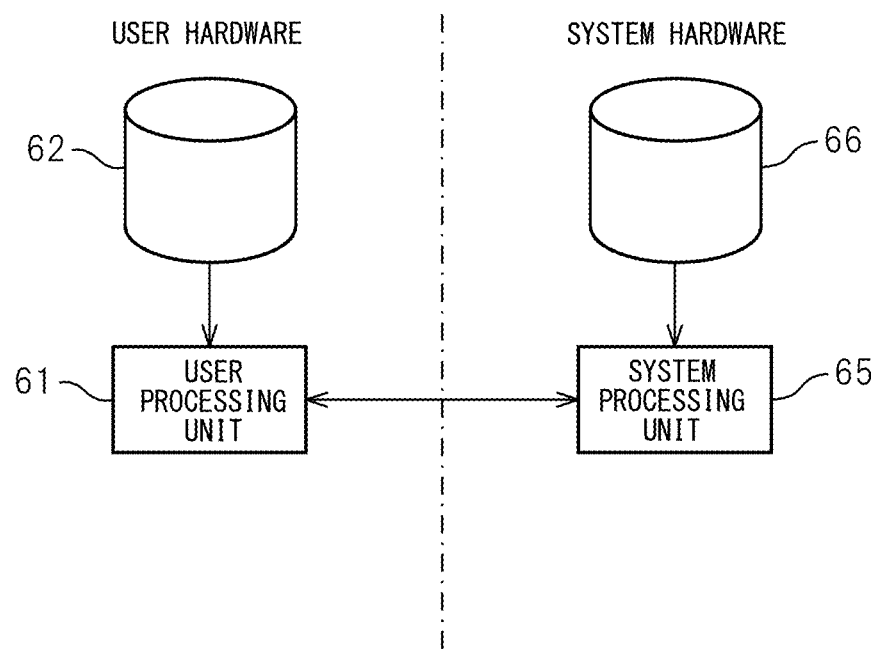
FIG. 13 illustrates a hardware configuration of a system for generating and providing a two-dimensional code upon a request.

FIG. 13 illustrates an example of a client-server configuration, which is a hardware configuration of a system for generating and providing a two-dimensional code upon a request.

The generating system comprises: a user hardware which is operated by a user who determines the specifications and requests a two-dimensional code to be generated; and a system hardware which generates and provides the requested two-dimensional code.

The user hardware comprises: a user processing unit 61, such as a computer; and a memory device 62, such as a magnetic disk.

The system hardware comprises: a system processing unit 65, such as a computer; and a memory device 66, such as a magnetic disk.

The user processing unit 61 and the system processing unit 65 are configured to enable communication therebetween, being connected through a communication line or the like.

Printing is performed on the user side; however, it may also be performed on the system side or at other printing place. A two-dimensional code may be printed on any medium such as a sheet of paper, a resin plate or a casing surface. A design to be embedded may be printed on the medium in advance, and a two-dimensional code is printed after setting the medium such that the printed design to be embedded is fitted into the design region.

Any printing apparatus can be employed as long as it is capable of printing a two-dimensional code on the above-mentioned media, and the printing apparatus may be, for example, a simple printer, a precision printers, or other printing apparatus capable of performing not only monochrome printing but also color printing. The generated two-dimensional code may also be transmitted as two-dimensional code data to the user via the communication line, without being printed. The user, as required, then transmits the data to a third party display or the like so that the generated two-dimensional code is displayed.

FIG. 13 illustrates an example of generating system having a client-server configuration; however, the generating system is not restricted thereto. A variety of modifications can be made and the generating system may take, for example, a configuration in which a two-dimensional code is issued by an encoding software on a client's PC and then printed by a USB-connected printer, or a configuration in which a two-dimensional code is issued from a hand-held terminal printer.

Figure 14:
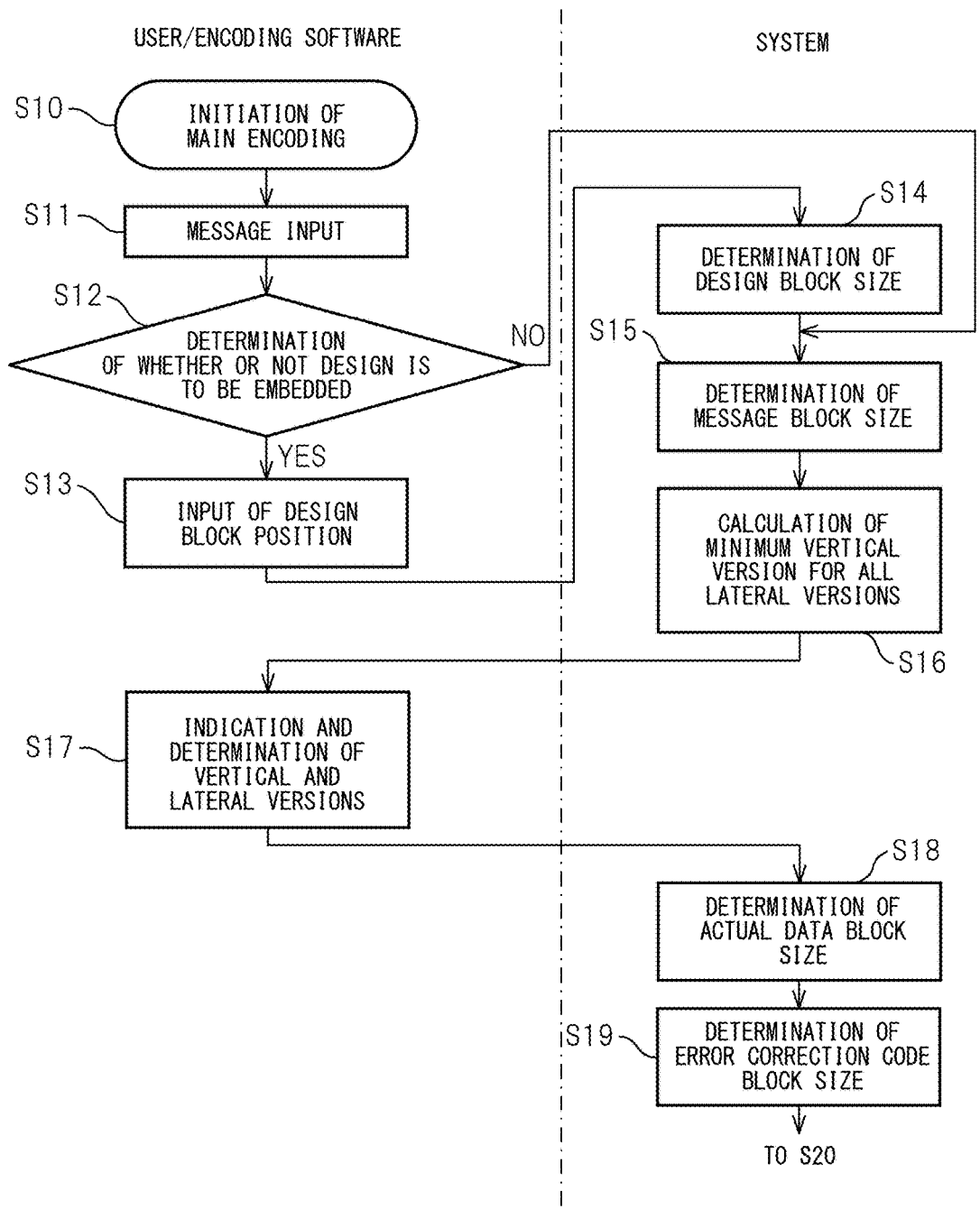
FIG. 14 is a flow chart illustrating the procedures of an encoding process in which a user accesses system hardware via user hardware and generates a desired two-dimensional code.
Figure 15:
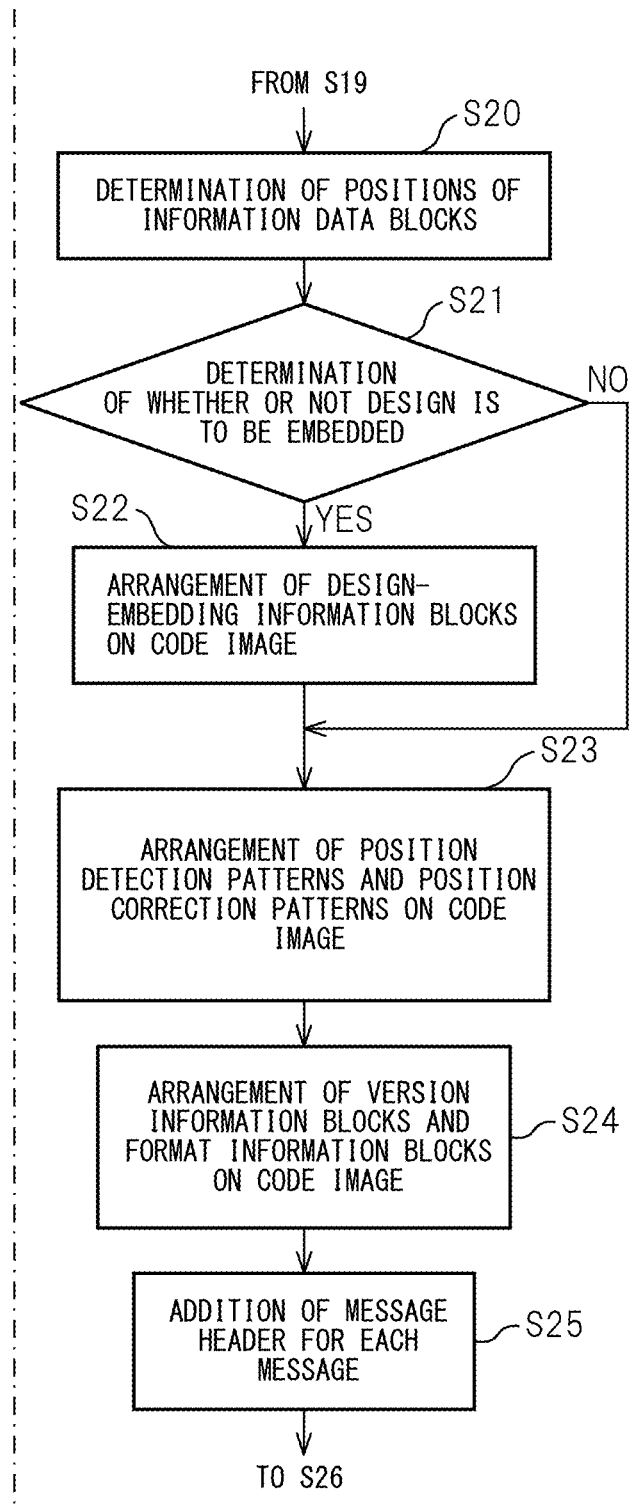
FIG. 15 is a flow chart illustrating the procedures of an encoding process in which a user accesses system hardware via a user hardware and generates a desired two-dimensional code.
Figure 16:
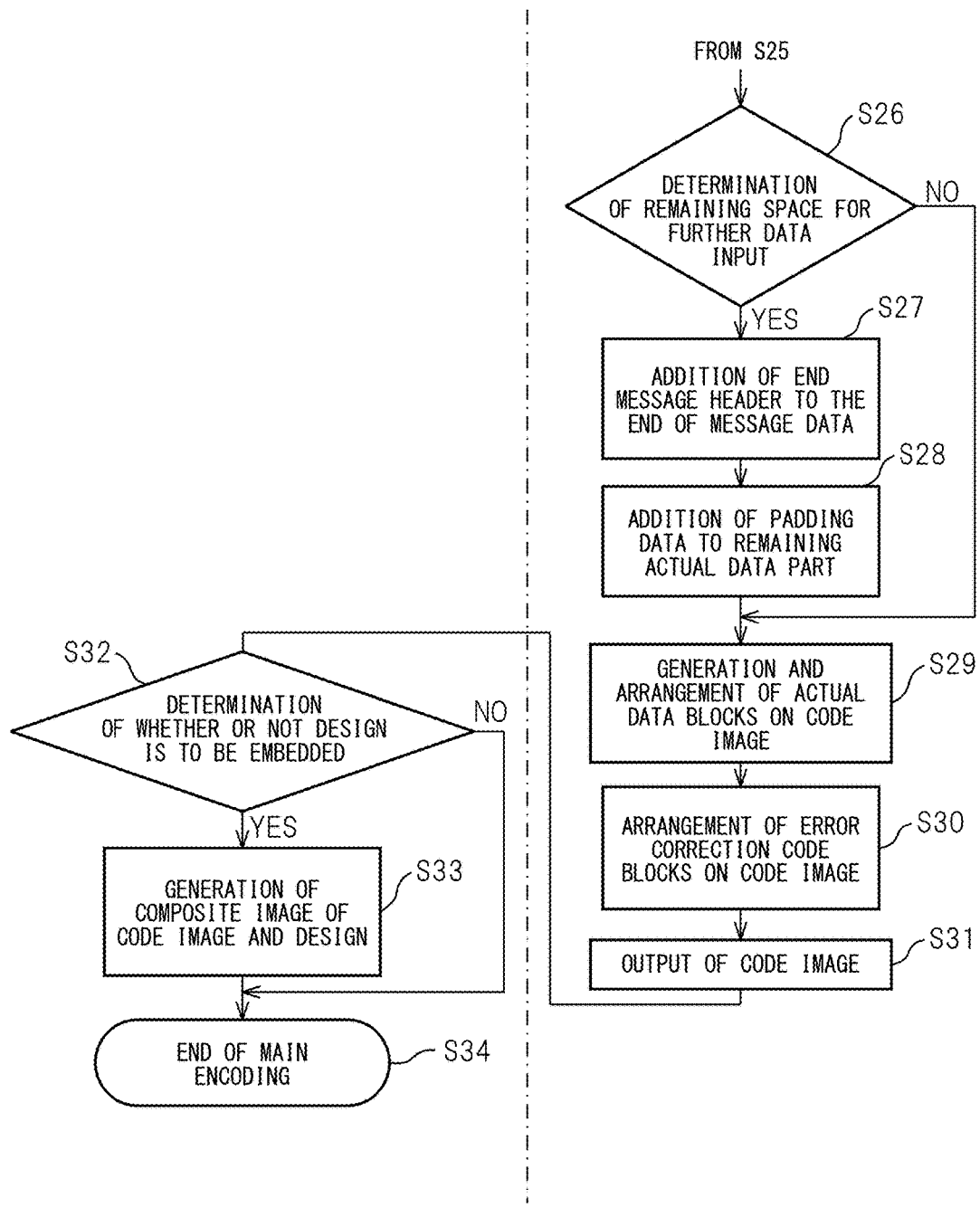
FIG. 16 is a flow chart illustrating the procedures of an encoding process in which a user accesses system hardware via a user hardware and generates a desired two-dimensional code.

FIGS. 14 to 16 are flow charts illustrating the procedures of the encoding process in which a user accesses the system hardware via the user hardware and generates a desired two-dimensional code.

In the step S10, the user initiates the main encoding process.

In the step S11, the user inputs a message(s) to be recorded in a two-dimensional code.

In the step S12, the user decides whether or not to embed a design into the two-dimensional code. If the user decided to embed a design, the user proceeds to the step S13 and, if the user decided not to embed a design, the user proceeds to the step S15, which is carried out in the system side. In the latter case, the user processing unit 61 notifies the system processing unit 65 about the message(s) and the absence of design to be embedded.

In the step S13, the user inputs the position of the block into which the design is embedded (design-embedding offset width, design-embedding offset height, design-embedding width and design-embedding height). The user processing unit 61 notifies the system processing unit 65 about the input message(s), the presence of a design to be embedded and the position of the block(s) into which the design is embedded.

In the step S14, in the system side, the block size of the design is determined based on the transmitted block position.

In the step S15, the block size for recoding the transmitted message(s) is determined.

In the step S16, the minimum vertical version is calculated for all lateral versions. In this calculation, from a value obtained by multiplying the number of vertical blocks by that of lateral blocks, the number of the position detection pattern blocks, the version information blocks and the format information blocks as well as, when a design is embedded, the design-embedding information blocks, the blocks corresponding to the design-embedding region and the position correction pattern blocks, is subtracted to determine the number of remaining blocks. Further, from this number of blocks, the number of error correction code blocks arranged to attain a certain error correction rate is subtracted, and the size of the message-recording actual data blocks that can be contained is indicated in a table form. The system processing unit 65 transmits the thus calculated table data to the user processing unit 61.

In the step S17, a table of the vertical-lateral versions is indicated to the user, and the user determines which version to be used. The user processing unit 61 transmits the thus determined vertical-lateral version to the system processing unit 65.

In the step S18, in the system side, based on the transmitted vertical-lateral version and the block size corresponding to the design-embedding region, the block size of the actual data is determined.

In the step S19, in the system side, based on the transmitted vertical-lateral version and the block size corresponding to the design-embedding region, the block size of the error-correcting code is determined.

In the step S20, in the system side, the positions of the version information blocks and format information blocks are determined. In addition, when a design is embedded, the positions of the design-embedding information blocks and design-embedding region blocks are also determined.

In the step S21, in the system side, it is determined whether or not a design is embedded. When a design is embedded, the system proceeds to the step S22, while when no design is embedded, the system proceeds to the step S23.

In the step S22, the design-embedding information blocks are arranged at prescribed positions on the code image part.

In the step S23, the position detection patterns and the position correction patterns are arranged on the image part.

In the step S24, the version information blocks and the format information blocks are arranged on the image part.

In the step S25, a message header is added to each message.

In the step S26, it is determined if there is still a space left for putting data. When there is a space left, the system proceeds to the step S27, while when there is no space left, the system proceeds to the step S29.

In the step S27, an end message header (end flag) is added to the end of the message data.

In the step S28, padding is added to the remaining actual data region.

In the step S29, the actual data are made into blocks and arranged on the image part.

In the step S30, the error correction code blocks are arranged on the image part.

In the step 31, the system processing unit 65 outputs and transmits a code image generating in the above-described manner to the user processing unit 61.

In the step 32, in the user side, it is determined whether or not a design is embedded. When a design is embedded, the user proceeds to the step S33, while when no design is embedded, the user proceeds to the step S34 to finish the encoding process.

In the step S33, a whole image is generated by integrating the transmitted code image with the data of the design to be embedded into the block(s) of the design-embedding region. The embedding of the design may also be performed by the system processing unit in the form of, for example, data attachment.

In the step S34, the main encoding process is finished.

In the above-described embodiment, the user side has the design data; however, the design data may be stored in the system side and specified by the user.

Figure 17:
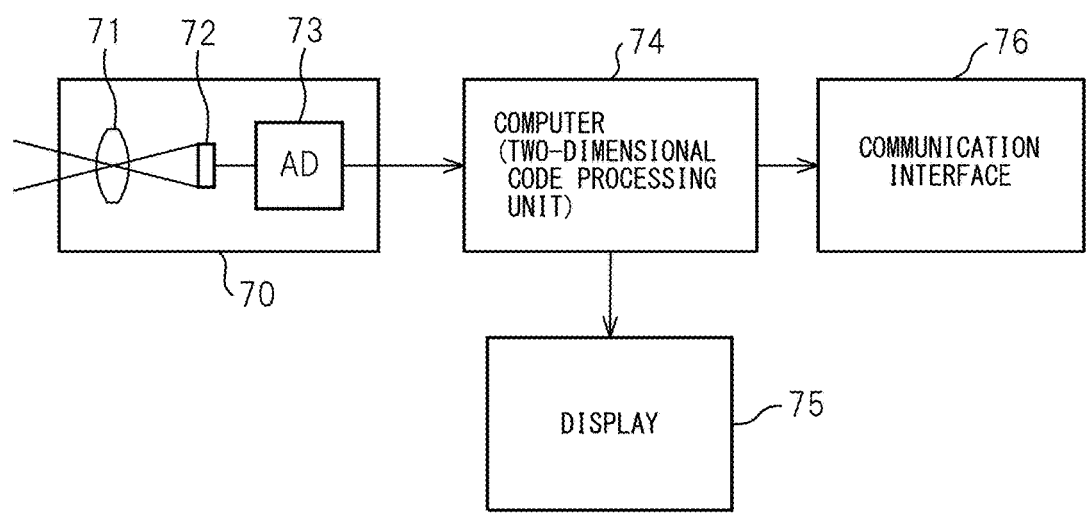
FIG. 17 illustrates a hardware configuration of a two-dimensional code analyzer which reads out and analyzes the two-dimensional code of the first embodiment.

FIG. 17 illustrates a hardware configuration of a two-dimensional code analyzer which reads out and analyzes the two-dimensional code of the first embodiment.

The two-dimensional code analyzer comprises: a reading unit 70; a computer (two-dimensional code analysis/processing unit) 74; a display 75; and a communication interface 76. The reading unit 70 comprises: a lens 71; an image sensor 72; and an analog-digital converter (AD) 73, and outputs digital image data of photographed two-dimensional code to the computer 74. The two-dimensional code analyzer illustrated in FIG. 17 is widely used and, in recent years, portable terminals have also realized the same functions as those of the two-dimensional code analyzer.

Figure 18:
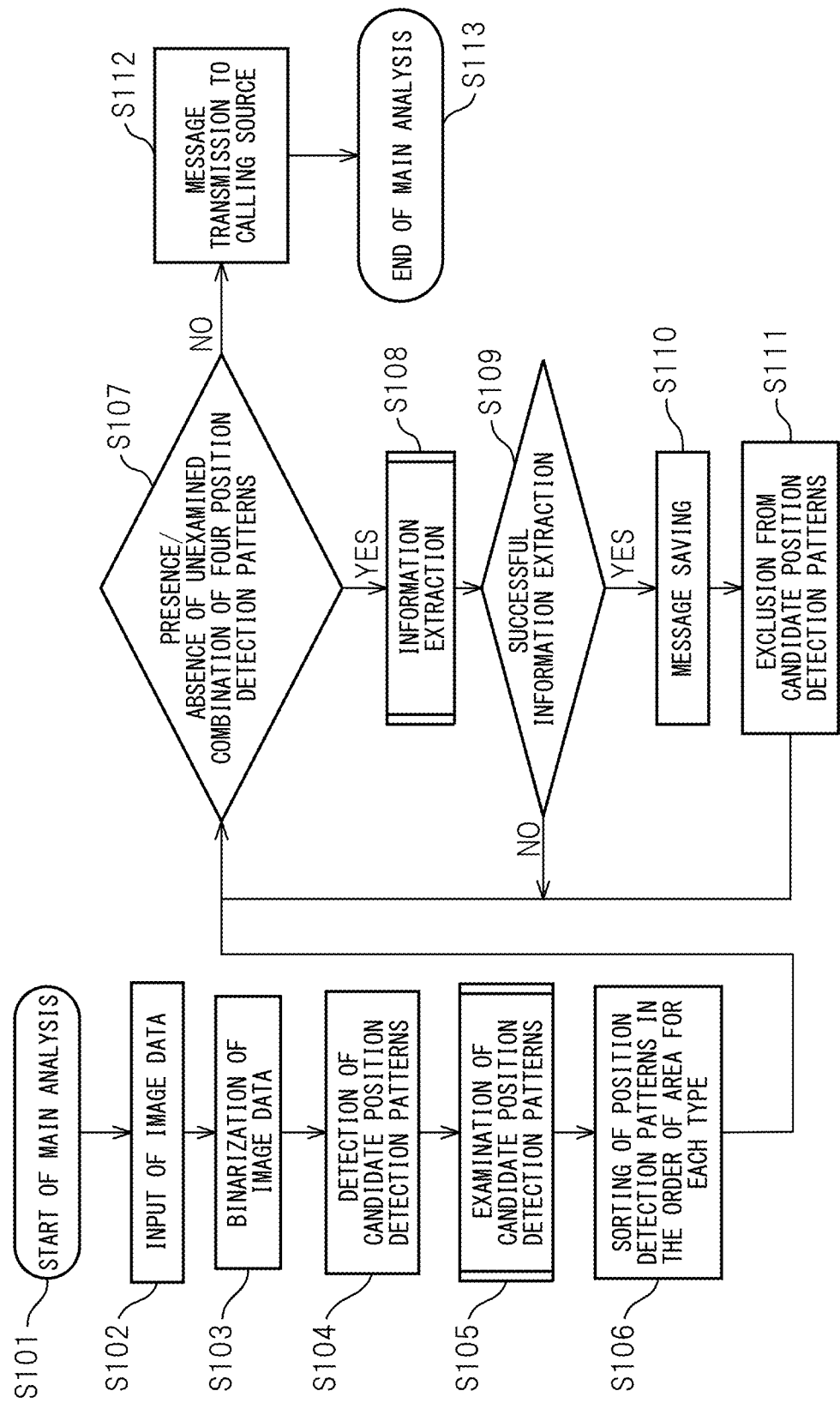
FIG. 18 is a flow chart illustrating the procedures of a decoding process in which two-dimensional codes photographed by a user are analyzed.
Figure 19:
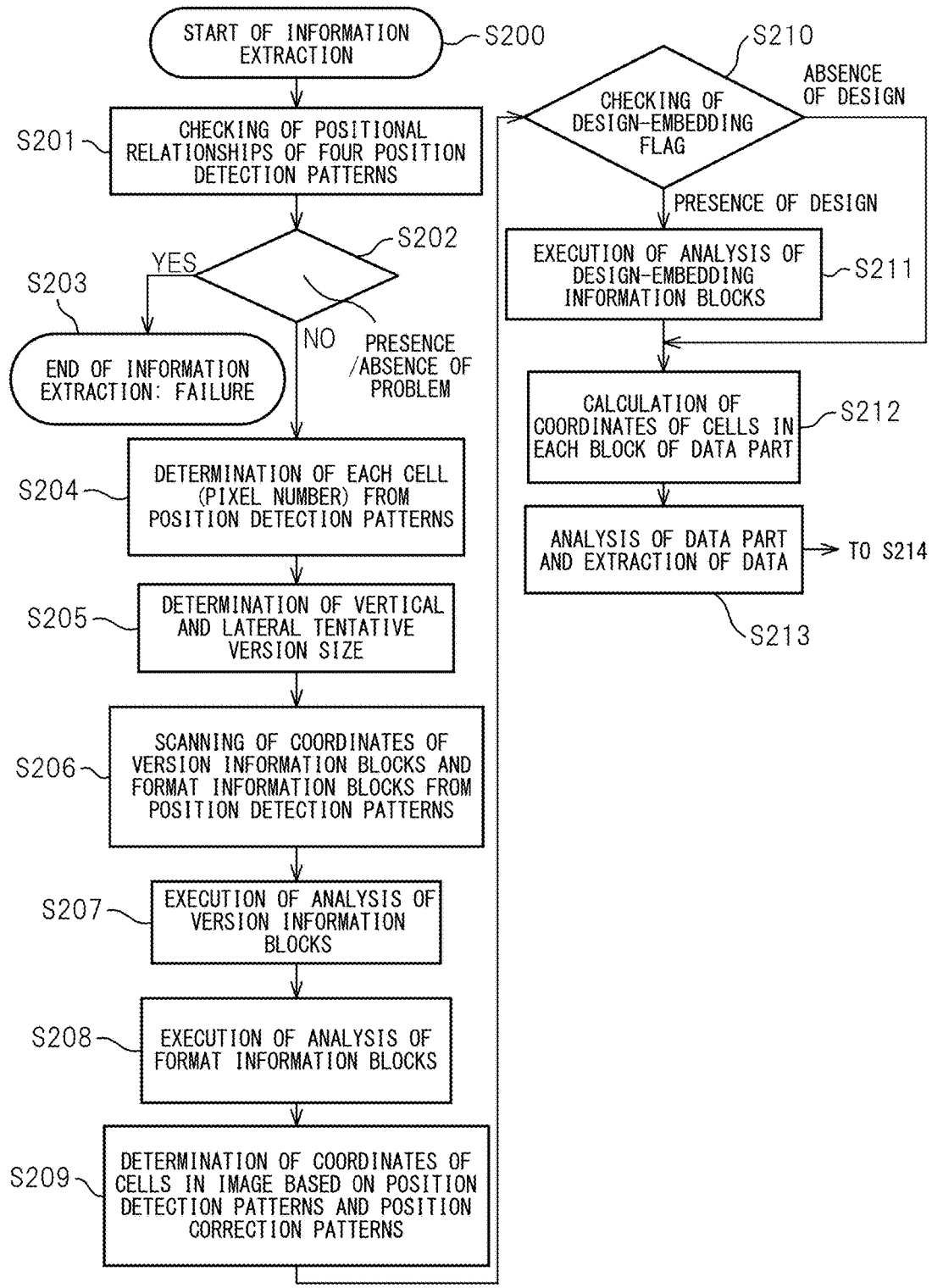
FIG. 19 is a flow chart illustrating the procedures of a decoding process in which two-dimensional codes photographed by a user are analyzed.
Figure 20:
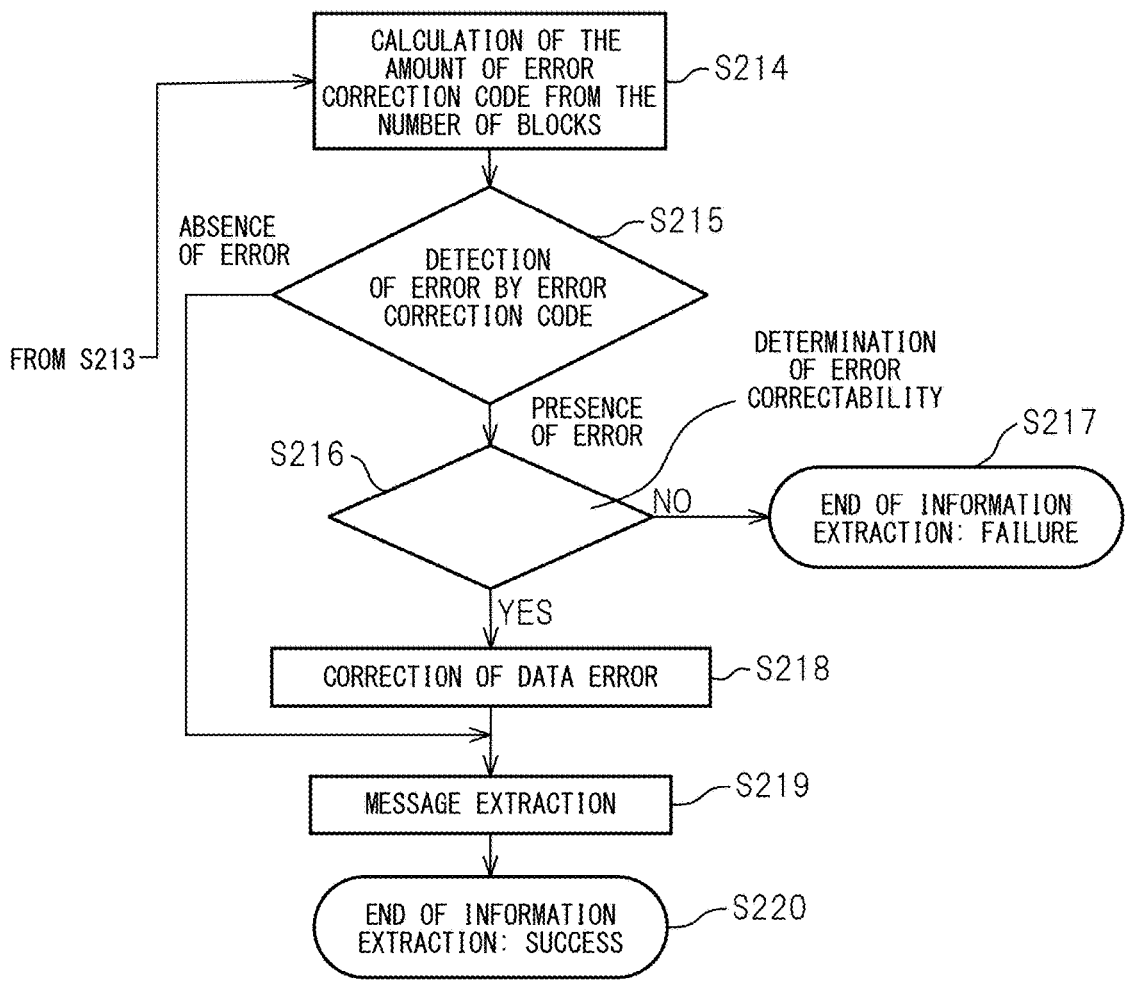
FIG. 20 is a flow chart illustrating the procedures of a decoding process in which two-dimensional codes photographed by a user are analyzed.

FIGS. 18 to 20 are flow charts illustrating the procedures of the decoding process in which two-dimensional codes photographed (taken) by the user are analyzed. This decoding process assumes a case where plural two-dimensional codes are projected on a single screen. The decoding process consists of a main analysis process and an information extraction process. First, the main analysis process will be described.

In the step S101, the main analysis process is initiated.

In the step S102, photographed images of two-dimensional codes are input.

In the step S103, binary images of each input photographed image are generating. As for the binarization method, when the input photographed image is a color image such as an RGB image, it is once converted into a gray-scale image. An average of the maximum and minimum brightness values in the image is taken as a threshold value, and pixels with a value of not less than the threshold value are defined to be "light" and pixels with a value of less than the threshold value are defined to be "dark". The gray-scale conversion of the color image is carried out using the RGB values of the respective pixels, in accordance with a conversion formula: Brightness=0.299R+0.587G+0.114B. The conversion method is not restricted to the above-described one as there have been proposed a variety of methods for conversion of a color image into a gray-scale image as well as for further conversion of the gray-scale image into a binary image.

In the step S104, candidate position detection patterns are detected. Specifically, starting at an upper left point of the image, the image is scanned in the X direction and, once reaching the right edge, the image is scanned in the X direction from the left edge starting at several pixels below. In other words, several pixels are omitted from the scanning. This scanning operation is repeated for the entire image. The number of the omitted pixels is: (Maximum number of omitted pixels)=(Minimum cell height of position detection pattern)×(Number of pixels per cell in photographing). Taking into consideration the rotation of the code as well, the minimum height of a position detection pattern refers to the minimum cell size in the Y direction that can be obtained by rotation of the position detection pattern and, in the present embodiment, the upper-left second position detection pattern in an unrotated state has a minimum height of 4 cells. When the number of pixels per cell in photographing is less than 1, even in an ideal image, it is difficult to distinguish a light cell from a dark cell. Considering displacement and rotation of cells in actual photographed images, it is desired that each cell have at least 3 pixels. When each cell has 3 pixels, the maximum number of the omitted pixels in the above-described case is 12 and the number of the image scanning operations is thus 1/12 of the total number of the pixels, so that the number of the scanning operations can be largely reduced.

In the step S105, the candidate position detection patterns are examined. Specifically, when a boundary between light and dark parts is found, the periphery of the dark part is scanned. In this process, the minimum and maximum X and Y coordinates of the dark part are determined. As a result, the circumscribing rectangle of the dark lump can be obtained. The upper left coordinates of this rectangle is represented as "(x1,y1)" and the lower right coordinates is represented as "(x2,y2)". Once the periphery is scanned, no more scanning thereof is necessary.

Even if such periphery exploration is performed, the number of the image scanning operations can be sufficiently reduced. One example of worst case where the processing time becomes the longest due to such periphery exploration is when one-pixel vertical stripes are arranged at one-pixel intervals. However, such a case does not occur in the first place and, even if it did, the number of the perimeter exploration operations can be maintained to be the same as the number of the scanning operations required for scanning all pixels once; therefore, the number of the scanning operations is not increased. The same also applies to other worst case scenarios.

In the case of the two-dimensional code of FIG. 1, the position detection patterns can be detected by exploring parts having a dark-light-dark-light-dark ratio of 1:1:3:1:1, which means that the position detection patterns can be found by one-time scanning. When the photographed code is tilted at an angle of 45°, the ratio of 1:1:3:1:1 can be obtained only when the code is scanned diagonally. The photographing orientation is freely selected in many cases; therefore, the orientation of the photographed code can be in any rotational position of 360°. In such cases, the number of the omittable scanning operations is small, and it cannot be increased because the actual rotational position is not known.

FIG. 21 illustrates checking of the shapes of the candidate position detection patterns.

Next, the forms of the candidate position detection patterns are checked. The position detection patterns of the two-dimensional code of the first embodiment all have a frame shape, i.e. a hollowed shape. Thus, the presence or absence of a hole is verified. With the starting point being set at the central point on the left side of the circumscribing rectangle (x1,(y1+y2)/2) and the end point being set at (x2,(y1+y2)/2), scanning is performed in the x-axis direction. In this process, it is confirmed that the following condition (1) or (2) is satisfied.

(1) The presence of a dark-light-dark sequence is confirmed. It is also confirmed that the pixel in the center between the leftmost first dark pixel (lx1) and the rightmost second dark pixel (rx1) is light.

(2) A dark-light-dark-light-dark pattern is searched. It is conformed that the pixel in the center between the leftmost first dark pixel (lx2) and the rightmost second dark pixel (rx2) is dark.

Further, in the case of (1), as illustrated in FIG. 21(A), scanning is also performed in the vertical direction from the center coordinates ((lx1+rx1)/2,(y1+y2)/2). The scanning of the upper part yields a light-dark-light sequence (end point: ((lx1+rx1)/2),y1−1)), and the scanning of the lower part also yields a light-dark-light sequence (end point: ((lx1+rx1)/2), y2+1)). It is confirmed that the middle point between the y-coordinates (ty1), which is at the boundary of dark and light on the upper side, and the y-coordinates (by1), which is at the boundary of dark and light on the lower side, has substantially the same coordinates as that of the light pixel in the center.

In the case of (2) as well, as illustrated in FIG. 21(B), scanning is also performed in the vertical direction from the center coordinates ((lx2+rx2)/2,(y1+y2)/2). The scanning of the upper part yields a dark-light-dark-light sequence (end point: ((lx2+rx2)/2),y1-1)), and the scanning of the lower part also yields a dark-light-dark-light sequence (end point: ((lx2+rx2)/2),y2+1)). It is confirmed that the middle point between the y-coordinates (ty2), which is at the boundary of the second dark part and the second light part on the upper side, and the y-coordinates (by2), which is at the boundary of the second dark part and the second light part on the lower side, has substantially the same coordinates as that of the light pixel in the center.

By the above-described processing, the first position detection pattern having a dark part in a frame (a square in a square frame) can be distinguished from the second to fourth position detection patterns having only a frame (a square or rectangular frame: box-form).

A pattern that does not satisfy the condition of (1) or (2) is not a position detection pattern.

Next, the apexes of each position detection pattern are explored. Each position detection pattern is scanned in the x-axis direction from the upper-left coordinates (x1,y1) of the circumscribing rectangle to the coordinates (x2,y1). The coordinates of the first dark point coming into contact is designated as "vortex 1" (vx1,vy1). The position detection pattern is then scanned in the y-axis direction from the upper-right coordinates (x2,y1) to the coordinates (x2,y2). The coordinates of the first dark point coming into contact in this scanning is designated as "vertex 2" (vx2,vy2). The position detection pattern is further scanned in the opposite x-axis direction from the lower-right coordinates (x2,y2) to the coordinates (x1,y2). The coordinates of the first dark point coming into contact in this scanning is designated as "vertex 3" (vx3,vy3). Thereafter, the position detection pattern is scanned in the opposite y-axis direction from the lower-left coordinates (x1,y2) to the coordinates (x1,y1). The coordinates of the first dark point coming into contact in this scanning is designated as "vertex 4" (vx4,vy4). The vortexes 1 to 4 should form a rectangle (including a square). If not, the scanned pattern is not a position detection pattern. Description of FIG. 21(B) is omitted.

Subsequently, the aspect ratio of the rectangle is examined. The length of one side of the rectangle is determined as $((vx1-vx2)\times(vx1-vx2)+(vy1-vy2)\times(vy1-vy2))^{1/2}$, and the length of the other side is determined as $((vx2-vx3)\times(vx2-vx3)+(vy2-vy3)\times(vy2-vy3))^{1/2}$. When the rectangle has an aspect ratio, (long side):(short side), of 1:1 and the form of (1), it is the second position detection pattern; when the rectangle has an aspect ratio, (long side):(short side), of 1:1 and the form of (2), it is the first position detection pattern; and when the rectangle has an aspect ratio, (long side):(short side), of 1:2 and the form of (1), it is the third or fourth position detection pattern. So far, these three types of position detection patterns can be distinguished from each other.

Next, the area of each position detection pattern is determined. It is noted here that this "area" refers to the area of the outer rectangular frame and thus includes the area of the inside space. In the case of the first position detection pattern, the area of the square inside the frame is also included. The area of each position detection pattern can be determined by subtracting the areas of the four right-angled triangles including the four corners from the area of the outer rectangle: Area=$(x2-x1)\times(y2-y1)-(vx1-vx4)\times(vy4-vy1)/2-(vx2-vx1)\times(vy2-vy1)/2-(vx2-vx3)\times(vy3-vy2)/2-(vx3-vx4)\times(vy3-vy4)/2$.

Then, the rotation angle is determined. For the first and second position detection patterns, since they are squares and a tilt of 90° or larger thus cannot be detected, a tilt angle is determined up to 90°. The angle is expressed in terms of clockwise rotation.

$$\theta = \arctan((vy2-vy1)/(vx2-vx1))$$

(wherein, θ represents a rotation angle)

For the third and fourth position detection patterns, the rotation angle is determined in a range of 0° to 180°. For the third position detection pattern, the distance between two coordinate is defined by a function: Length $(x1,y1,x2,y2) = ((x2-x1)^2+(y2-y1)^2)^{1/2}$. In a range of 0° to 45°, length (vx1,vy1,vx2,vy2)>length (vx4,vy4,vx1,vy1) and (x2-x1)>(y2-y1), and the rotation angle is determined by: $\theta=\arctan((vy2-vy1)/(vx2-vx1))$. In a range of 45° to 90°, length (vx1,vy1,vx2,vy2)>length (vx4,vy4,vx1,vy1) and (x2-x1)<(y2-y1), and the rotation angle is determined by: $\theta=\arctan((vy2-vy1)/(vx2-vx1))$. In a range of 90° to 135°, length (vx1,vy1,vx2,vy2)<length (vx4,vy4,vx1,vy1) and (x2-x1)<(y2-y1), and the rotation angle is determined by: $\theta=\arctan((vy2-vy1)/(vx2-vx1))+90°$. In a range of 135° to 150°, length (vx1,vy1,vx2,vy2)<length (vx4,vy4,vx1,vy1) and (x2-x1)>(y2-y1), and the rotation angle is determined by: $\theta=\arctan((vy2-vy1)/(vx2-vx1))+90°$. The rotation angle θ of the fourth position detection pattern is also determined in the same manner.

Next, the center coordinates of the position detection patterns are detected. The center coordinates is defined as the center of the circumscribing rectangle, which is ((x1+x2)/2,(y1+y2)/2).

By the above-described operations, the examination of the candidate position detection patterns is completed.

In the step S106, the position detection patterns that have already been differentiated into three types are sorted in the descending order of area for each type.

In the step S107, a combination of the four types of position detection patterns is generating. First, among the candidates for the first position detection patterns, one which has the largest area is selected. With the area of this first position detection pattern being defined as S, a candidate for the second position detection pattern which as a combination of an area of S/4 and the same rotation angle is searched. Once the second position detection pattern is found, candidates for the third and fourth position detection patterns that have an area of S/2 are searched. Further, a combination of a candidate having the same rotation angle and a candidate having a rotation angle different by 90° is searched.

When a plurality of two-dimensional codes are projected on a single screen, considering all kinds of combinations of the candidate position detection patterns, there is an enormous number of possible position detection pattern combinations. As in the present invention, by using position detection patterns that are all different from each other, the number of possible combinations can be largely reduced. In addition, by applying the characteristics determined in advance, such as shape, area and rotation, the combinations can be further narrowed down with simple comparative mathematical operation. This operation will be described later.

In the step S107, it is determined whether there is or is not any combination of the four position detection patterns left unexamined. If there is, the operation proceeds to the step S108 and, if not, the operation proceeds to the step S112.

In the step S108, information is extracted from combined position detection patterns that are considered to belong to the same two-dimensional code. This process will be described later referring to FIGS. 19 and 20.

In the step S109, depending on the result of the information extraction, when the extraction was successful, the operation proceeds to the step S110, while when the extraction failed, the combination of position detection patterns for which the extraction failed is excluded, and the operation returns back to the step S107.

In the step S110, the message of the successfully extracted information is saved.

In the step S111, the candidates used for the two-dimensional pattern from which data were successfully extracted are excluded from the candidate position detection patterns, and the operation returns back to the step S107. When an unused candidate position detection pattern is included in the range of the two-dimensional pattern from which data were successfully extracted, it is also excluded from the candidates.

By repeating the steps S107 to S111, the analysis of projected two-dimensional codes is completed. When there are still candidate position detection patterns that have not been excluded, for combinations of two or more thereof, the information extraction of the step S108 may be carried out. This will be described later.

In the step S112, an analysis completion message is transmitted to the calling source.

In the step S113, the main analysis process is finished.

Next, the information extraction process of the step S108 will be described referring to FIGS. 19 and 20.

In the step S200, information extraction is initiated.

In the step S201, the relationship of four position combination patterns in a given combination is checked. This checking is done by determining whether the below-described conditions (a) and (b) are satisfied. When any of these items is not satisfied, the presence of a problem is assumed and the information extraction process is terminated.

First, the center coordinate of the first, second, third and fourth position detection patterns are defined as pt1, pt2, pt3 and pt4, respectively, and these points are then connected in the order of pt1, pt3, pt2, pt4 and pt1. A rectangle is thereby obtained when the combination of the four position detection patterns is correct.

(a) All of the corners have a right angle.
(b) The opposing sides have the same length (1:1).

In the step S202, the presence or absence of a problem is determined based on the result of the above-described checking. When there was a problem, the operation proceeds to the step S203 where a flag indicating failed information extraction is placed, while when there was no problem, the operation proceeds to the step S204.

In the step S204, from any one of the position detection patterns, the number of pixels per cell is determined. In the case of the second position detection pattern, it has an area of 4×4=16 cells, and the number of pixels per cell is determined by an equation: Number of pixels per cell= $((area)/16)^{1/2}$.

In the step S205, the distance between the center coordinate of adjacent position detection patterns is measured in each of the vertical and lateral directions and the thus obtained distance values are each divided by the value determined in the step S204, thereby the cell size of the two-dimensional code in the vertical and lateral directions can be determined. With the thus obtained lateral distance between the center coordinate being defined as "d" pixels and the number of pixels per cell being defined as "p" pixels/cell, the lateral cell size of the code is determined by an equation: Code lateral cell size=d/p+(4+6). The vertical cell size is also determined in the same manner.

In the step S205, based on the thus determined cell sizes, the version of the two-dimensional code is tentatively decided. The version number stepwisely increases every 8 cells. Since the lateral cell size of the code is determined by an equation: Code lateral cell size=lateral version×8+19, the lateral version of the code can be determined by modifying this equation to: Lateral version=(cell size−19)/8. The thus obtained lateral version number is used as a tentative lateral version. When there is no version that matches the cell size, a version with the closest cell size is designated. The tentative vertical version is also decided in the same manner. The reason why the thus decided versions are tentative is because the possibility that accurate values are not obtained due to photographing at an angle, bending of the printed paper or the like is taken into consideration. The version information blocks are also used in combination so that accurate values can be obtained.

In the step S206, by scanning the two-dimensional code in the directions of each position detection pattern to its adjacent position detection patterns, the coordinates of the cells constituting the version information blocks and format information blocks in the photographed image are detected.

In the step S207, the (vertical and lateral) version information blocks are analyzed. As a result, the vertical and lateral versions are determined. Failure of the analysis leads to termination of the operation. As described above, the version information blocks and the format information blocks each indicate 20 values. As the vertical and lateral version information blocks, each type is arranged at two spots. When the values that are read out from the vertical and lateral version information blocks each arranged at two spots are identical to at least two of the three values of the tentative version information obtained from the code width, the code height and the position detection pattern size, those values are adopted.

In the step S208, the format information blocks are analyzed. The presence or absence of a design to be embedded and the data embedding method for each block are thereby determined. Failure of the analysis leads to termination of the operation. The format information blocks are arranged at three spots and, when two or more thereof yielded the same results, these results are adopted.

In the step S209, the coordinates of a position correction pattern is calculated and the coordinate of each cell in the image of the two-dimensional code are determined with high precision. Although the coordinate of the cells have already been derived, the position correction pattern allows the effects of lens distortion to be reduced. Since the coordinates of the position correction pattern in the image have already been determined, it is confirmed that the point at the coordinates is dark. Then, starting from this point, scanning is performed toward the right-hand side to find the boundary of dark and light pixels, and the periphery thereof is then scanned in the same manner as in the step S105. With the upper-left and lower-right coordinate of the circumscribing rectangle being defined as (x1,y1) and (x2,y2), respectively, the center coordinates are obtained as ((x1+x2)/2,(y1+y2)/2)).

In the step 210, the presence or absence of a design to be embedded in the format information blocks is determined. When the presence was determined, the operation proceeds to the step S211, while when the absence was determined, the operation proceeds to the step S212.

In the step S211, by referring to the design-embedding information blocks, the vertical and lateral offset width and height of the design-embedding block as well as the width and height of the design-embedding block are determined.

In the step S212, with respect to the actual data blocks and error correction code blocks, any nearest four points are selected from the center coordinate of the position detection patterns and those of the position correction patterns, and the coordinate of the cells in the photographed image are determined by projective transformation.

In the step S213, with respect to the actual data blocks and error correction code blocks, in accordance with the data type of the format information blocks, a plurality of light (1) and dark (0) data are detected.

In the step S214, from the number of the actual data blocks and error correction code blocks, the number of the error correction codes is calculated. By this, the actual data and the error correction codes are determined.

In the step S215, with respect to the data region and the error correction codes, the number and positions of errors are detected using the error correction codes. When the number of errors is 0, the operation proceeds to the step S219. Otherwise, the operation proceeds to the step S216.

In the step S216, it is determined whether or not the errors are correctable. When the errors are correctable, the operation proceeds to the step S218, while when the errors are not correctable, the operation proceeds to the step S217.

In the step S217, since no message was obtained due to the failure of information extraction, the operation is terminated.

In the step S218, using the error correction codes, the errors in the actual data are corrected.

In the step S219, the resulting actual data are composed of a header(s) (message type(message encode)-message size), a message(s), an end flag and padding. A combination of a header and a message is defined as a segment. An end flag is a special segment which does not contain any message. There may be a plurality of segments. When an end flag is found, what follows the end flag is all padding. From the data, the message(s) is/are reconstructed.

In the step S220, the information extraction process is finished.

Projective transformation requires at least 4 sets of coordinate. For the above-described analysis process, a case where four position detection patterns can be detected was described; however, due to contamination, blurriness, fuzziness or the like of the image, it is possible that only three or two position detection patterns can be detected. In the present invention, in such a case, since the detected three or two position detection patterns have different shapes, the type(s) of the undetected position detection pattern(s) is/are determined from the positional relationships of the detected three or two position detection patterns; therefore, the positions of the undetected position detection patterns can be easily estimated. For example, in the two-dimensional code of the first embodiment, when three position detection patterns are detected, since two position detection patterns that are arranged diagonally to each other can be identified based on their shapes, it can be estimated that the undetected position detection pattern is arranged, with respect to the straight line connecting the two diagonally-arranged position detection patterns, at a mirror-symmetrical position of the other position detection pattern. Further, when two position detection patterns are detected, the positional relationship of the two position detection patterns is determined based on their shapes. For example, if these two position detection patterns are arranged adjacent to each other, it is estimated that the remaining two position detection patterns exist at positions that are away from the straight line connecting the two detected position detection patterns at the same distance in the direction perpendicular to the straight line. Meanwhile, if the two detected position detection patterns are arranged diagonally to each other, it is estimated that the remaining two position detection patterns exist at the intersections of the lines extending from each side of the two detected position detection patterns. For example, when the third and fourth position detection patterns are identified, extension of the two short sides of each of these position detection patterns yields a total of four intersections, which correspond to the four apexes of the first position detection pattern. In the same manner, the four intersections formed by extending the long sides correspond to the apexes of the second position detection patterns. Also when the first and second position detection patterns are identified, the positions of the remaining two position detection patterns can be estimated by the same method. Needless to say, as compared to a case where all four position detection patterns are detected, the estimation accuracy is reduced when three of them are detected, and the estimation accuracy is further reduced when only two of them are detected. In any case, the positions of the four position detection patterns are tentatively decided in the above-described manner, and they are applied to projective transformation so as to obtain the positional information on the position correction patterns. Then, the position correction patterns are utilized for coordinate corrections, and the coordinate of the four position detection patterns are ultimately determined, based on the coordinate of the detected position detection patterns and their coordinate thus corrected by the position correction patterns.

Considering that there may be an undetectable position detection pattern(s) due to contamination or the like, a larger number of the position detection patterns is more desirable; however, an increase in the number of the position detection patterns not only increases the area ratio represented by the position detection patterns and thereby reduces the data efficiency, but also increases the work load required for detection of the position detection patterns. Therefore, it is desired that the number of the position detection patterns be decided as appropriate in accordance with the mode of use and the like of the two-dimensional code.

Next, for a case where a plurality of two-dimensional codes are projected on a single screen, the use of the two-dimensional code of the present invention is compared with the use of the two-dimensional code of FIG. 1. For example, when six of the two-dimensional code of FIG. 1 is projected on a single screen, 18 identical position detection patterns are projected on the screen. It is supposed that, as described above, the 18 position detection patterns are detected and, for all combinations of three position detection patterns, it is checked if the three position detection patterns of each combination belong to the same two-dimensional code. In this case, the number of the combinations is $_{18}C_3$=816. If one two-dimensional code contains four identical position detection patterns, the number of the position detection patterns projected on the screen is 24, which means that the number of the combinations is $_{24}C_4$=10,624. In this manner, the number of such combinations is huge and this leads to an increase in the processing time.

In contrast, when the position detection patterns are different as in the case of the present invention, the number of combinations of three different position detection patterns is $_6C_1 \times _6C_1 \times _6C_1$=216 and that of four different position detection patterns is $_6C_1 \times _6C_1 \times _6C_1 \times _6C_1$=1,296, so that the number of such combinations is largely reduced.

Further, in the above-described analysis process, the position detection patterns are detected by scanning while some parts of the screen are omitted from the scanning; however, as long as one candidate position detection pattern can be found, from its shape, it is possible to estimate the orientation and distance range of other position detection patterns to a certain extent and, by restricting the scanning to their regions, the efficiency of detecting the position detection patterns can be improved. For example, in the two-dimensional codes of the first and second embodiments, it can be estimated that the second position detection pattern exists on the extension of the long sides of the third and fourth position detection patterns and that the first position detection pattern exists on the extension of the short sides, which are perpendicular to the respective long sides, of the third and fourth position detection patterns. When two or three position detection patterns are detected, the regions in which other position detection pattern(s) can be expected to exist are further limited.

In the above-described two-dimensional codes, four different position detection patterns are arranged; however, data can be extracted with high accuracy also from a two-dimensional code having a constitution in which three different position detection patterns and one or more position correction patterns are arranged. In this case, the position detection patterns are arranged in such a manner that one of the four position detection patterns is absent.

In the analysis of such a two-dimensional code, after detecting the three position detection patterns, the coordinates of the part lacking a position detection pattern are extrapolated from the positional relationships of other position detection patterns. However, when the two-dimensional code is photographed at an angle from above, it is concerned that the extrapolated coordinates might contain an error. Therefore, from a total of four sets of coordinates, which are the coordinates of the three position detection patterns and the extrapolated coordinates, the coordinates of the position correction pattern that is closest to the part of the missing position detection pattern are obtained by projective transformation.

Then, the position correction pattern is scanned to correct its coordinates. Next, using a total of four sets of coordinates, which are the coordinates of the three position detection patterns and one position correction pattern, mapping of the data coordinates is carried out. The position correction pattern has an effect of reducing errors in coordinates and thereby enables acquisition of highly accurate coordinates, so that data can be extracted with high accuracy even from a two-dimensional code having three position detection patterns and one or more position correction patterns.

When a position correction pattern is already arranged, since the number of the position detection patterns is reduced by one, the efficiency of the code is improved. On the other hand, the redundancy of the position detection patterns is reduced, and this leads to a reduction in the tolerance to contamination and the like.

Further, it is not always that only one photographed image is input, and a case where an image synthesized from a plurality of input images is analyzed can also be considered. Examples of such a case include those cases where an image is produced from time-series consecutive images such as an animation and this image is analyzed, and those cases where a code image is divided into plural pieces and then input.

Moreover, such an application where a single data set is obtained by displaying different codes in series by animation and recognizing all of these codes can also be considered. In this case, a plurality of codes may also be arranged on a paper, not in an animation format.

The two-dimensional code of the present invention can also be applied to these cases.

Thus far, embodiments of the present invention have been described; however, these descriptions of the embodiments are provided simply for the purpose of explaining the present invention, and it will be understood by those of ordinary skill in the art that various modifications can be made within the scope of claims.

DESCRIPTION OF SYMBOLS

12A First position detection pattern
12B Third position detection pattern
12C Fourth position detection pattern
12D Second position detection pattern
15 Version information block (vertical)
16 Version information block (lateral)
17 Format information block
18A-18B Design-embedding information block (vertical)
19A-19B Design-embedding information block (lateral)

What is claimed is:

1. A two-dimensional code, comprising cells representing binary-coded data that are arranged as a pattern in the form of a two-dimensional matrix,
   wherein the two-dimensional code comprises three or more different position detection patterns, each position detection pattern having a different shape, different size, or different arrangement orientation that individually enables the two-dimensional code to be detectable from an image, and
   each of the three or more different position detection patterns has an elliptical external shape, or has a right triangle external shape, or has a first rectangle and a second rectangle, wherein the first rectangle and the second rectangle intersect perpendicularly with each other at a position in a center of each rectangle.

2. The two-dimensional code according to claim 1, comprising four or more of the position detection patterns that can be individually detected from an image.

3. The two-dimensional code according to claim 1, comprising one or more position correction patterns.

4. The two-dimensional code according to claim 1, wherein
   the region of the two-dimensional matrix that excludes the parts of the position detection patterns is divided into a plurality of blocks having the same size, and
   the two-dimensional matrix comprises a light or dark separation space between adjacent blocks.

5. The two-dimensional code according to claim 4, wherein the position detection patterns each have an area larger than the blocks.

6. The two-dimensional code according to claim 5, wherein
   the blocks each have a size of 3×3 cells,
   the separation space has a width of one cell, and
   the position detection patterns each have a lateral width of four or more cells and a vertical length of four or more cells.

7. The two-dimensional code according to claim 1, wherein
   at least two of the three or more position detection patterns are in the form of a frame comprising an identification space therein, and
   the identification space is a space twice or larger than the smallest cell constituting the two-dimensional code.

8. The two-dimensional code according to claim 1, wherein
   the two-dimensional code comprises four or more of the position detection patterns that can be individually detected from an image,
   at least three of the four or more position detection patterns are in the form of a frame comprising an identification space therein, and
   the identification space is a space twice or larger than the smallest cell constituting the two-dimensional code.

9. A system for generating the two-dimensional code according to claim 1, the system comprising a computer configured to execute the steps of
   arranging the three or more position detection patterns, which can be individually detected from an image, at prescribed positions of a two-dimensional matrix;
   arranging, in a region of the two-dimensional matrix outside the regions where the three or more position detection patterns are arranged, a base information region where base information required for analysis of the two-dimensional code is recorded; and
   sequentially arranging message-recorded data in a region of the two-dimensional matrix outside the regions where the three or more position detection patterns and the base information region are arranged.

10. The system for generating a two-dimensional code according to claim 9, wherein the computer is configured further to execute arranging, at the prescribed positions of the two-dimensional matrix, the four or more position detection patterns that can be individually detected from an image.

11. A two-dimensional code, comprising cells representing binary-coded data that are arranged as a pattern in the form of a two-dimensional matrix,
   wherein the two-dimensional code comprises four or more position detection patterns, each position detection pattern having a different shape, different size, or different arrangement orientation that individually enables the two-dimensional code to be detectable from an image, and
   the four or more position detection patterns include four position detection patterns composed of:
   a square first position detection pattern;
   a square second position detection pattern, which is smaller than the first position detection pattern; and rectangular third and fourth position detection patterns,
the long side of the rectangular third position detection pattern and that of the rectangular fourth position detection pattern extend in different directions, and
the four position detection patterns are arranged on four corners of the two-dimensional matrix.

12. The two-dimensional code according to claim 11, wherein
the first and second position detection patterns are arranged on the opposite diagonal corners,
the third and fourth position detection patterns are arranged on the opposite diagonal corners,
the long side of the third position detection pattern and that of the fourth position detection pattern have the same length as the side of the first position detection pattern,
the short side of the third position detection pattern and that of the fourth position detection pattern have the same length as the side of the second position detection pattern,
one of the short sides of the third position detection pattern and that of the fourth position detection pattern are arranged on the extension of the side of the first position detection pattern, and
one of the long sides of the third position detection pattern and that of the fourth position detection pattern are arranged on the extension of the side of the second position detection pattern.

13. The two-dimensional code according to claim 11, wherein
the first and second position detection patterns each have a single square frame, and
the third and fourth position detection patterns each have a single rectangular frame.

14. The two-dimensional code according to claim 11, wherein
the first position detection pattern has a single square frame and a square arranged therein,
the second position detection pattern has a single square frame, and
the third and fourth position detection patterns each have a single rectangular frame.

15. A two-dimensional code, comprising cells representing binary-coded data that are arranged as a pattern in the form of a two-dimensional matrix,
wherein the two-dimensional code comprises two position different detection patterns, each position detection pattern having a different shape, different size, or different arrangement orientation that are arranged at opposite diagonal corners and individually enables the two-dimensional code to be detectable from an image, and
each of the two different position detection patterns has an elliptical external shape, or has a right triangle external shape, or has a first rectangle and a second rectangle, wherein the first rectangle and the second rectangle intersect perpendicularly with each other at a position in a center of each rectangle.

16. The two-dimensional code according to claim 15, wherein the two position detection patterns are surrounded by light cells.

17. A method of analyzing a two-dimensional code from a taken image of the two-dimensional code, the two-dimensional code comprising:
cells representing binary-coded data that are arranged as a pattern in the form of a two-dimensional matrix; and
three position detection patterns that can be individually detected from an image, each position detection pattern having a different shape, different size, or different arrangement orientation,
wherein the method comprises, when the three position detection patterns are identified:
estimating a fourth position at which no position detection pattern is arranged, based on the identified three position detection patterns; and
converting the coordinates of the two-dimensional code based on the positional relationships of at least four positions, including the thus estimated fourth position and the identified three position detection patterns, and
when two of the three position detection patterns, which are arranged at opposite diagonal corners, are identified:
estimating the position of the remaining position detection pattern and a fourth position at which no position detection pattern is arranged, based on the positional relationships of the identified two position detection patterns; and
converting the coordinates of the two-dimensional code based on the positional relationships of at least four positions, including the thus estimated position of the remaining position detection pattern and the fourth position as well as the positions of the identified two different shaped position detection patterns.

18. The method of analyzing a two-dimensional code according to claim 17, wherein
the two-dimensional code comprises a position correction pattern, and
the method comprises, when the three position detection patterns and the position correction pattern are identified:
estimating a fourth position at which no position detection pattern is arranged, based on the identified three position detection patterns and position correction pattern; and
converting the coordinates of the two-dimensional code based on the positional relationships of at least four positions, including the thus estimated fourth position and the identified three position detection patterns, and
when two of the three position detection patterns, which are arranged at opposite diagonal corners, and the position correction pattern are identified:
estimating the position of the remaining position detection pattern and a fourth position at which no position detection pattern is arranged, based on the identified two position detection patterns and position correction pattern; and
converting the coordinates of the two-dimensional code based on the positional relationships of at least four positions, including the thus estimated position of the remaining position detection pattern and fourth position as well as the positions of the identified two position detection patterns.

19. A method of analyzing a two-dimensional code from an image taken of the two-dimensional code, the two-dimensional code comprising:
cells representing binary-coded data that are arranged as a pattern in the form of a two-dimensional matrix; and
four or more position detection patterns that can be individually detected from an image, wherein each position detection pattern having a different shape, different size, or different arrangement orientation,
wherein the method comprises, when four or more of the position detection patterns are identified:

converting the coordinates of the two-dimensional code based on the positional relationships of at least four of the position detection patterns, and when two or three of the four or more position detection patterns are identified:

estimating the position(s) of the remaining position detection pattern(s) based on the positional relationships of the identified two or three position detection patterns, and converting the coordinates of the two-dimensional code based on the positional relationships of at least four of the position detection patterns, including the thus estimated position(s) of the position detection pattern(s).

20. The method of analyzing a two-dimensional code according to claim 19, wherein the two-dimensional code comprises a position correction pattern, and the identified position correction pattern is utilized for estimating the position(s) of the remaining position detection pattern(s) based on the positional relationships of the identified two or three position detection patterns.

21. A computer readable non-transitory storage medium for storing a program, the program comprising instructions when executed by a processor to control a computer to analyze a two-dimensional code from an image taken of the two-dimensional code, the two-dimensional code comprising:

cells representing binary-coded data that are arranged as a pattern in the form of a two-dimensional matrix; and three position detection patterns that can be individually detected from an image, each position detection pattern having a different shape, different size, or different arrangement orientation, wherein the program controls the computer such that the computer, when three position detection patterns are identified, estimates a fourth position at which no position detection pattern is arranged, based on the identified three position detection patterns; and converts the coordinates of the two-dimensional code based on the positional relationships of at least four positions, including the thus estimated fourth position and the identified three position detection patterns, and when two of the three position detection patterns, which are arranged at opposite diagonal corners, are identified, estimates the position of the remaining position detection pattern and a fourth position at which no position detection pattern is arranged, based on the positional relationships of the identified two position detection patterns; and converts the coordinates of the two-dimensional code based on the positional relationships of at least four positions, including the thus estimated position of the remaining position detection pattern and the fourth position as well as the positions of the identified two position detection patterns.

22. The computer readable non-transitory storage medium according to claim 21, wherein the two-dimensional code comprises a position correction pattern, and the program controls the computer such that the computer, when the three position detection patterns and the position correction pattern are identified, estimates a fourth position at which no position detection pattern is arranged, based on the identified three position detection patterns and position correction pattern; and converts the coordinates of the two-dimensional code based on the positional relationships of at least four positions, including the thus estimated fourth position and the identified three position detection patterns, and when two of the three position detection patterns, which are arranged at opposite diagonal corners, and the position correction pattern are identified, estimates the position of the remaining position detection pattern and a fourth position at which no position detection pattern is arranged, based on the identified two position detection patterns and position correction pattern; and converts the coordinates of the two-dimensional code based on the positional relationships of at least four positions, including the thus estimated position of the remaining position detection pattern and fourth position as well as the positions of the identified two position detection patterns.

23. A computer readable non-transitory storage medium for storing a program, the program comprising instructions when executed by a processor to control a computer to analyze a two-dimensional code from an image taken of the two-dimensional code, the two-dimensional code comprising:

cells representing binary-coded data that are arranged as a pattern in the form of a two-dimensional matrix; and four or more different shaped position detection patterns that can be individually detected from an image, each position detection pattern having a different shape, different size, or different arrangement orientation, wherein the program controls the computer such that the computer, when four or more of the position detection patterns are identified, converts the coordinates of the two-dimensional code based on the positional relationships of at least four of the position detection patterns, and when two or three of the four or more position detection patterns are identified, estimates the position(s) of the remaining position detection pattern(s) based on the positional relationships of the identified two or three position detection patterns; and converts the coordinates of the two-dimensional code based on the positional relationships of at least four of the position detection patterns, including the thus estimated position(s) of the position detection pattern(s).

24. The computer readable non-transitory storage medium according to claim 23, wherein the two-dimensional code comprises a position correction pattern, and the program controls the computer such that the computer, by utilizing the position correction pattern, estimates the position(s) of the remaining position detection pattern(s) based on the positional relationships of the identified two or three position detection patterns.

25. A two-dimensional code, comprising cells representing binary-coded data that are arranged as a pattern in the form of a two-dimensional matrix, wherein the two-dimensional code comprises four or more position detection patterns, each position detection pattern having a different shape, different size, or different arrangement orientation, the four or more position detection patterns include four position detection patterns composed of:

a square second position detection pattern;

a rectangular third position detection pattern;

a rectangular fourth position detection pattern whose long side extends in different direction from that of the third position detection pattern; and a first position detection pattern having a first length extending in the same direction as the long side of the third position detection pattern and a second length extending in the same direction as the long side of the fourth position detection pattern, the first and second position detection patterns are arranged on the opposite diagonal corners, the third and fourth position detection patterns are arranged on the opposite diagonal corners, the long side of the third position detection pattern has the same length as the first length of the first position detection pattern, the long side of the fourth position detection pattern has the same length as the second length of the first position detection pattern, the short side of the third position detection pattern and that of the fourth position detection pattern have the same length as the side of the second position detection pattern, one of the short sides of the third position detection pattern and that of the fourth position detection pattern are arranged on the extension of the contour of the first position detection pattern, and one of the long sides of the third position detection pattern and that of the fourth position detection pattern are arranged on the extension of the side of the second position detection pattern.

26. The two-dimensional code according to claim 25, wherein the four position detection patterns are arranged on four corners of the two-dimensional matrix.

27. The two-dimensional code according to claim 25, wherein the first position detection pattern has a first rectangle and a second rectangle, wherein the second rectangle extends perpendicularly from the end part of the first rectangle.

28. A two-dimensional code, comprising cells representing binary-coded data that are arranged as a pattern in the form of a two-dimensional matrix, wherein the two-dimensional code comprises four or more position detection patterns, each position detection pattern having a different shape, different size, or different arrangement orientation, the four or more position detection patterns include four position detection patterns composed of:

a rectangular second position detection pattern;

a rectangular third position detection pattern;

a rectangular fourth position detection pattern whose long side extends in different direction from that of the third position detection pattern; and a first position detection pattern having a first length extending in the same direction as the long side of the third position detection pattern and a second length extending in the same direction as the long side of the fourth position detection pattern, the first and second position detection patterns are arranged on the opposite diagonal corners, the third and fourth position detection patterns are arranged on the opposite diagonal corners, the long side of the third position detection pattern has the same length as the first length of the first position detection pattern, the long side of the fourth position detection pattern has the same length as the second length of the first position detection pattern, the short side of the third position detection pattern has the same length as the long side of the second position detection pattern, the short side of the fourth position detection pattern has the same length as the short side of the second position detection pattern, one of the short sides of the third position detection pattern and that of the fourth position detection pattern are arranged on the extension of the contour of the first position detection pattern, one of the long sides of the third position detection pattern is arranged on the extension of the short side of the second position detection pattern, and one of the long sides of the fourth position detection pattern is arranged on the extension of the long side of the second position detection pattern.

29. A two-dimensional code, comprising cells representing binary-coded data that are arranged as a pattern in the form of a two-dimensional matrix, wherein the two-dimensional code comprises four or more position detection patterns, each position detection pattern having a different shape, different size, or different arrangement orientation, the four or more position detection patterns include four position detection patterns composed of:

a rectangular second position detection pattern;

a rectangular third position detection pattern;

a rectangular fourth position detection pattern whose long side extends in different direction from that of the third position detection pattern; and a first position detection pattern having a first length extending in the same direction as the long side of the third position detection pattern and a second length extending in the same direction as the long side of the fourth position detection pattern, the first and second position detection patterns are arranged on the opposite diagonal corners, the third and fourth position detection patterns are arranged on the opposite diagonal corners, the long side of the third position detection pattern has the same length as the first length of the first position detection pattern, the long side of the fourth position detection pattern has the same length as the second length of the first position detection pattern, the short side of the third position detection pattern has the same length as the short side of the second position detection pattern, the short side of the fourth position detection pattern has the same length as the long side of the second position detection pattern, one of the short sides of the third position detection pattern and that of the fourth position detection pattern are arranged on the extension of the contour of the first position detection pattern, one of the long sides of the third position detection pattern is arranged on the extension of the long side of the second position detection pattern, and one of the long sides of the fourth position detection pattern is arranged on the extension of the short side of the second position detection pattern.

30. A two-dimensional code, comprising cells representing binary-coded data that are arranged as a pattern in the form of a two-dimensional matrix, wherein the two-dimensional code comprises three or more position detection patterns, each position detection pattern having a different shape, different size, or different arrangement orientation that individually enables the two-dimensional code to be detectable from an image, and the three or more position detection patterns are composed of a combination of at least one square first position detection pattern, at least rectangular second and third position detection patterns, or at least square first and second position detection patterns and at least one rectangular third position detection pattern, at least two of the three or more position detection patterns are in the form of a frame comprising an identification space therein, and wherein each identification space is a space at least twice as large as the smallest cell constituting the two-dimensional code.

31. The two-dimensional code according to claim 30, wherein at least one of the three or more position detection patterns has a rectangle pattern in the identification space.

32. The two-dimensional code according to claim 31, wherein each identification space is a space quadruple or larger in size than the smallest cell constituting the two-dimensional code and the rectangle pattern is at least twice as large as the smallest cell constituting the two-dimensional code.

33. A two-dimensional code, comprising cells representing binary-coded data that are arranged as a pattern in the form of a two-dimensional matrix, wherein the two-dimensional code comprises three or more position detection patterns, each position detection pattern having a different shape, different size, or different arrangement orientation that individually enables the two-dimensional code to be detectable from an image, and at least two of the three or more position detection patterns are in the form of a closed frame comprising an identification space therein, and each identification space is a space at least twice as large as the smallest cell constituting the two-dimensional code.

34. A two-dimensional code, comprising cells representing binary-coded data that are arranged as a pattern in the form of a two-dimensional matrix, wherein the two-dimensional code comprises two position detection patterns, each position detection pattern having a different shape, different size, or different arrangement orientation that is arranged at opposite diagonal corners and individually enables the two-dimensional code to be detectable from an image, and the two position detection patterns are in the form of a closed frame comprising an identification space therein, and each identification space is a space at least twice as large as the smallest cell constituting the two-dimensional code.

\* \* \* \* \*